(12) United States Patent
Kagawa et al.

(10) Patent No.: US 8,958,986 B2
(45) Date of Patent: Feb. 17, 2015

(54) PARKING ASSISTANCE APPARATUS

(75) Inventors: Kazunori Kagawa, Nagoya (JP); Yuka Sobue, Nagoya (JP); Satoru Niwa, Susono (JP); Shin Tanaka, Susono (JP); Akihisa Yokoyama, Susono (JP); Kazuhiro Morimoto, Susono (JP); Junichi Wakita, Susono (JP); Chika Yoshioka, Susono (JP); Yu Hiei, Toyota (JP); Ryuji Okamura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 211 days.

(21) Appl. No.: 13/807,520

(22) PCT Filed: Jun. 28, 2011

(86) PCT No.: PCT/IB2011/001500
§ 371 (c)(1),
(2), (4) Date: Mar. 15, 2013

(87) PCT Pub. No.: WO2012/001487
PCT Pub. Date: Jan. 5, 2012

(65) Prior Publication Data
US 2013/0173148 A1    Jul. 4, 2013

(30) Foreign Application Priority Data

Jun. 29, 2010  (JP) .................................. 2010-147702
Oct. 15, 2010  (JP) .................................. 2010-232654

(51) Int. Cl.
*G01C 21/00* (2006.01)
*B60Q 1/48* (2006.01)

(52) U.S. Cl.
USPC ........... 701/527; 701/467; 345/581; 345/621; 340/932.2; 340/937; 348/119; 280/761; 180/199

(58) Field of Classification Search
USPC .................. 701/400, 408, 523, 467, 527; 340/932.2, 937, 435, 436; 348/119; 345/581, 621; 280/761; 180/199
See application file for complete search history.

(56) References Cited

U.S. PATENT DOCUMENTS

| 7,561,180 B2 * | 7/2009 | Koike ........................... 348/148 |
| 7,643,935 B2 * | 1/2010 | Sakakibara et al. .......... 701/494 |
| 7,660,659 B2 * | 2/2010 | Watanabe et al. ............... 701/96 |

(Continued)

FOREIGN PATENT DOCUMENTS

| CN | 1819944 A | 8/2006 |
| CN | 101635839 A | 1/2010 |
| DE | 10 2007 052 816 | 5/2008 |
| EP | 1 502 815 | 2/2005 |
| EP | 2 119 602 | 11/2009 |
| JP | 2001 10432 | 1/2001 |
| JP | 2001 213253 | 8/2001 |
| JP | 2001 315600 | 11/2001 |
| JP | 2001-322519 A | 11/2001 |
| JP | 2002 36991 | 2/2002 |
| JP | 2003 54340 | 2/2003 |
| JP | 2003 146161 | 5/2003 |
| JP | 2004-25942 | 1/2004 |
| JP | 2006-21722 A | 1/2006 |
| JP | 2006 160147 | 6/2006 |
| JP | 2006 264389 | 10/2006 |
| JP | 2008-7090 A | 1/2008 |
| JP | 2009 83680 | 4/2009 |
| JP | 2009 298385 | 12/2009 |
| JP | 2011 189841 | 9/2011 |
| JP | 2012 11817 | 1/2012 |
| JP | 2012 11818 | 1/2012 |
| WO | 2009 144893 | 12/2009 |

OTHER PUBLICATIONS

International Search Report Issued Oct. 10, 2011 in PCT/IB11/001500 Filed Jun. 28, 2011.

*Primary Examiner* — Ronnie Mancho
(74) *Attorney, Agent, or Firm* — Oblon, Spivak, McClelland, Maier & Neustadt, L.L.P.

(57) ABSTRACT

A parking assistance apparatus includes a display unit that displays an image of a scene behind a host vehicle. At least when the host vehicle moves forward or when the host vehicle is stopped, the display unit displays an indication including a plurality of kinds of trajectories along which the host vehicle is able to back up from a point at which the host vehicle is currently positioned, in a manner such that the indication is superimposed on the image of the scene behind the host vehicle.

23 Claims, 21 Drawing Sheets

(56) References Cited

U.S. PATENT DOCUMENTS

| | | |
|---|---|---|
| 7,706,944 B2 * | 4/2010 | Tanaka et al. .................. 701/41 |
| 7,760,113 B2 * | 7/2010 | Uhler ........................ 340/932.2 |
| 8,085,167 B2 * | 12/2011 | Tanaka et al. ............. 340/932.2 |
| 8,134,594 B2 * | 3/2012 | Nagamine et al. ............. 348/149 |
| 8,232,893 B2 * | 7/2012 | Endo et al. .................... 340/908 |
| 8,285,479 B2 * | 10/2012 | Kawabata et al. ............ 701/301 |
| 8,384,561 B2 * | 2/2013 | Kadowaki et al. ......... 340/932.2 |
| 8,560,185 B2 * | 10/2013 | Narazaki et al. ............... 701/50 |
| 8,655,551 B2 * | 2/2014 | Danz et al. ..................... 701/44 |
| 2002/0041239 A1 | 4/2002 | Shimizu et al. |
| 2003/0030724 A1 | 2/2003 | Okamoto |
| 2006/0190147 A1 | 8/2006 | Lee et al. |
| 2008/0111669 A1 | 5/2008 | Yamanaka et al. |
| 2008/0174452 A1 | 7/2008 | Yamamoto et al. |
| 2009/0303080 A1 | 12/2009 | Kadowaki et al. |
| 2010/0033348 A1 | 2/2010 | Kawabata et al. |
| 2011/0013019 A1 | 1/2011 | Yamanaka et al. |

* cited by examiner

P

F I G . 13
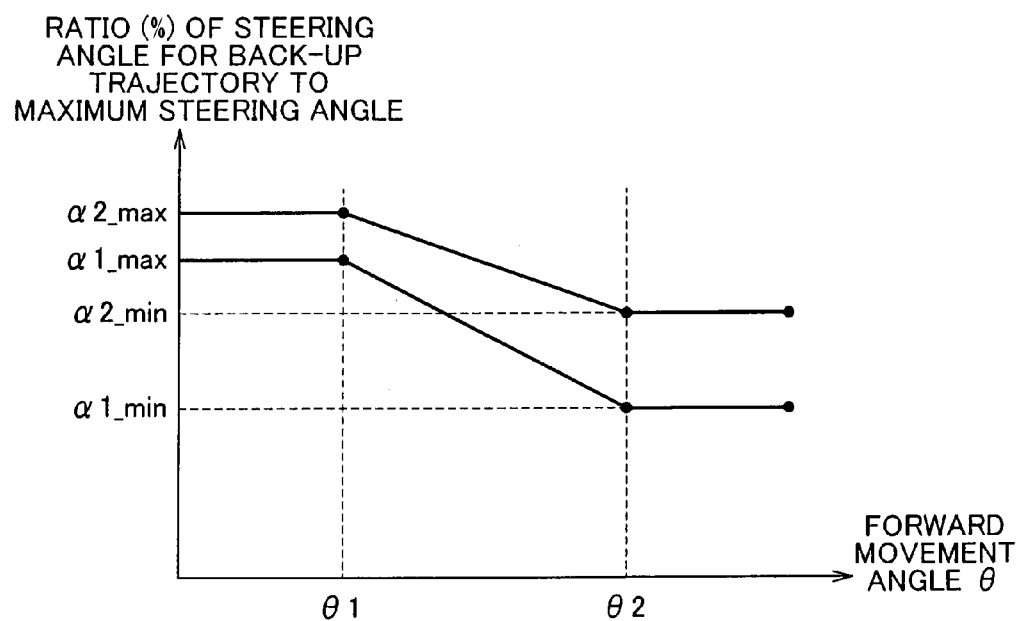

F I G . 15
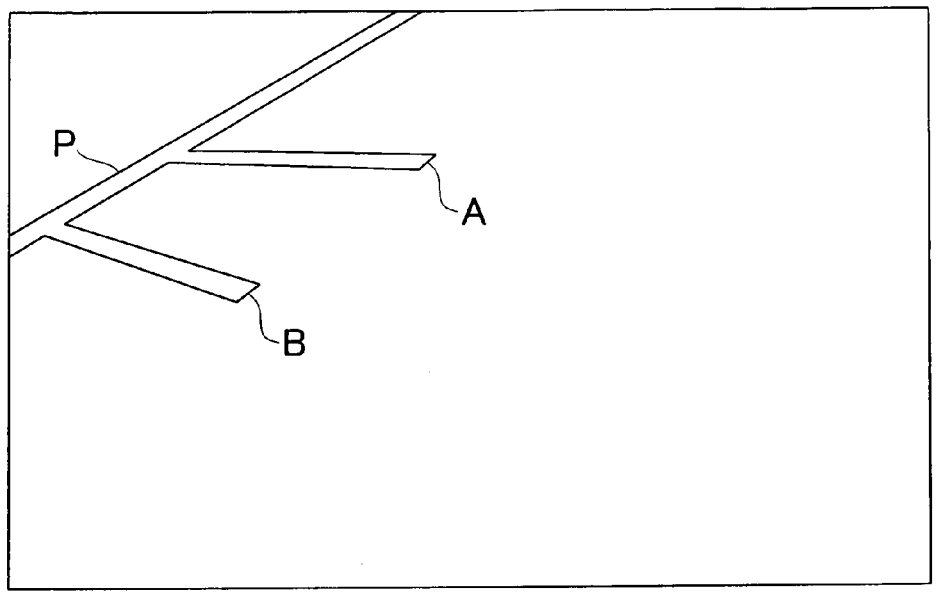

PARKING ASSISTANCE APPARATUS

BACKGROUND OF THE INVENTION

1. Field of the Invention

The invention relates to a parking assistance apparatus, and more particularly to a parking assistance apparatus in which the image of a scene behind a host vehicle is displayed.

2. Description of Related Art

An apparatus is proposed, in which the image of a scene behind a host vehicle is displayed to assist a driver in driving the host vehicle when the host vehicle is to be parked in a parking frame. For example, Japanese Patent Application Publication No. 2001-213253 (JP-A-2001-213253) describes an apparatus in which a guidance trajectory is displayed. The guidance trajectory is a trajectory along which a vehicle is estimated to move if the vehicle backs up with a steering angle being fixed to the maximum steering angle. In the apparatus described in the publication No. 2001-213253, information on surroundings, which is obtained by a sensor, and the position of the host vehicle are displayed on a display screen. In the apparatus described in the publication No. 2001-213253, a host vehicle symbol and the guidance trajectory are integrally displayed on the screen so that the vehicle starts to back up at a position at which the guidance trajectory falls within a parking space. Further, in the apparatus described in the publication No. 2001-213253, an estimated trajectory, whose shape is changed in accordance with the actual steering angle of a steering wheel, is also displayed. Thus, it is also possible to guide a steering operation by overlapping the estimated trajectory with the guidance trajectory.

However, in the above-described technology, the function of assisting the driver's operation at the time of parking is not sufficient, and thus, there is room for improvement.

SUMMARY OF THE INVENTION

The invention provides a parking assistance apparatus that provides more effective parking assistance.

A first aspect of the invention relates to a parking assistance apparatus including a display unit that displays an image of a scene behind a host vehicle. At least when the host vehicle moves forward or when the host vehicle is stopped, the display unit displays an indication including a plurality of kinds of trajectories along which the host vehicle is able to back up from a point at which the host vehicle is currently positioned, in a manner such that the indication is superimposed on the image of the scene behind the host vehicle.

With the configuration, the driver is able to select the trajectory from among the plurality of trajectories corresponding to, for example, different steering angles. Therefore, for example, even if the host vehicle passes a point from which the host vehicle is able to back up at the maximum steering angle into the parking frame, variation in a back-up start position is accommodated and the host vehicle is easily parked in the parking frame, by selecting the trajectory from among the plurality of trajectories corresponding to, for example, different steering angles.

In this case, the display unit may display the trajectories each of which includes a curved portion and a straight line portion, the curved portion may extend rearward from the point at which the host vehicle is currently positioned, and the straight line portion may extend from a rear end portion of the curved portion; and the display unit may display the trajectories in a manner such that a length of the curved portion of each of the trajectories is changed in accordance with an angle formed by a longitudinal direction of a parking frame in which the host vehicle is to be parked, and a longitudinal direction of the host vehicle.

With the configuration, the driver is able to park the host vehicle in the parking frame, by performing an operation to back up the host vehicle while turning the host vehicle, and then, performing an operation to back up the host vehicle at the steering angle of 0°. This makes it further easier to park the host vehicle in the parking frame. Also, the driver is able to easily and intuitively recognize a guide for performing operations to back up the host vehicle from the point at which the host vehicle VM is currently positioned, while turning the host vehicle VM, and to back up the host vehicle at the steering angle of 0° at the position at which the host vehicle becomes parallel to the longitudinal direction of the parking frame.

The display unit may display the trajectories each of which includes a curved portion and a straight line portion, the curved portion may extend from the point at which the host vehicle is currently positioned, to a point at which the curved portion is parallel to a longitudinal direction of a parking frame in which the host vehicle is to be parked, and the longitudinal direction of the parking frame, in which the host vehicle is to be parked, may be parallel to the straight line portion.

With the configuration, the driver is able to make the host vehicle parallel to the parking frame by backing up the host vehicle and making the steering angle 0° at a position at which the curved portion of the displayed trajectory is connected to the straight line portion. This makes it further easier to park the host vehicle VM in the parking frame.

The display unit may display the trajectories corresponding to steering angles of the host vehicle, which are changed in accordance with an angle formed by a longitudinal direction of a parking frame in which the host vehicle is to be parked and a longitudinal direction of the host vehicle.

With the configuration, even when the angle formed by the longitudinal direction of the parking frame and the longitudinal direction of the host vehicle varies, the trajectory and the parking frame easily overlap with each other, and thus, the driver is able to easily recognize the trajectory along which the host vehicle should back up. Also, in the case where the host vehicle is to be parked, before the host vehicle backs up into the parking frame, the host vehicle turns while moving forward, so that the angle formed by the longitudinal direction of the parking frame and the longitudinal direction of the host vehicle is freely adjusted. Thus, while seeing the trajectories corresponding to the steering angles that are changed in accordance with the angle formed by the longitudinal direction of the parking frame and the longitudinal direction of the host vehicle, the driver is able to easily move the host vehicle to the back-up start position at which the driver is able to easily see the parking frame and the trajectories, and from which the host vehicle easily backs up into the parking frame.

The display unit may display the trajectories corresponding to the steering angles of the host vehicle, which are increased with increase in the angle formed by the longitudinal direction of the parking frame in which the host vehicle is to be parked and the longitudinal direction of the host vehicle.

With the configuration, even when the angle formed by the longitudinal direction of the parking frame and the longitudinal direction of the host vehicle is large, the trajectory and the parking frame easily overlap with each other. Thus, the driver is able to easily recognize the trajectory along which the host vehicle should back up. Also, even when the angle formed by the longitudinal direction of the parking frame and the longitudinal direction of the host vehicle is large, the driver is able to easily see the parking frame and the trajectories, and thus, the driver is able to easily move the host vehicle to the back-up start position from which the host vehicle easily backs up into the parking frame.

A second aspect of the invention relates to a parking assistance apparatus including a display unit that displays an image of a scene behind a host vehicle. The display unit displays a trajectory along which the host vehicle is to back up from a point at which the host vehicle is currently positioned, in a manner such that the trajectory is superimposed on the image of the scene behind the host vehicle, in accordance with a time point at which a parking frame, in which the host vehicle is to be parked, is displayed in the image of the scene behind the host vehicle.

With the configuration, the driver is able to easily recognize the back-up start position at which the host vehicle should start to back up, and thus, the driver is able to easily park the host vehicle in the parking frame, for example, as compared to when employing an apparatus in which the trajectory along which the host vehicle VM is to back up is displayed although the parking frame is not displayed.

In this case, the display unit may display the trajectory along which the host vehicle is to back up from the point at which the host vehicle is currently positioned, in the manner such that the trajectory is superimposed on the image of the scene behind the host vehicle, after the time point at which the parking frame, in which the host vehicle is to be parked, is displayed in the image of the scene behind the host vehicle.

With the configuration, the driver is able to easily recognize the back-up start position at which the host vehicle should start to back up, and thus, the driver is able to easily park the host vehicle in the parking frame, as compared to when employing an apparatus in which the trajectory along which the host vehicle VM is to back up is displayed although the parking frame is not displayed.

In the above-described aspects, when the host vehicle backs up, the display unit may display one kind of trajectory along which the host vehicle is to back up, in accordance with an actual steering angle of the host vehicle.

With the configuration, the driver is able to easily and intuitively recognize the trajectory corresponding to the actual steering angle of the host vehicle. Particularly, in the case where when the host vehicle moves forward or when the host vehicle is stopped, the display unit displays the indication including the plurality of kinds of trajectories along which the host vehicle is able to back up from the point at which the host vehicle is currently positioned, play caused by the plurality of kinds of trajectories can be reduced by displaying the trajectory corresponding to the actual steering angle of the host vehicle when the host vehicle backs up. This makes it easy to accurately park the host vehicle in the parking frame.

In the above-described aspects, the display unit may display the trajectory or the plurality of kinds of trajectories along which the host vehicle is to move if the host vehicle backs up while being steered toward a side opposite to a side toward which the host vehicle is steered when the host vehicle moves forward.

With the configuration, in the parking method that is most commonly used, it is not necessary for the driver to select which of the trajectory toward the right side and the trajectory toward the left side should be displayed. This makes it further easier to perform the operation to park the host vehicle.

With the parking assistance apparatus according to the above-described aspects of the invention, it is possible to provide more effective parking assistance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 13 is a graph showing a relation between a forward movement angle and the ratio of a steering angle for the depicted trajectories to the maximum steering angle;

FIG. 15 is a view showing the image of the parking frame that is actually displayed in the display unit of the parking assistance apparatus according to the embodiment, before the time point T1 in FIG. 14;

DETAILED DESCRIPTION OF EMBODIMENTS

Figure 1:
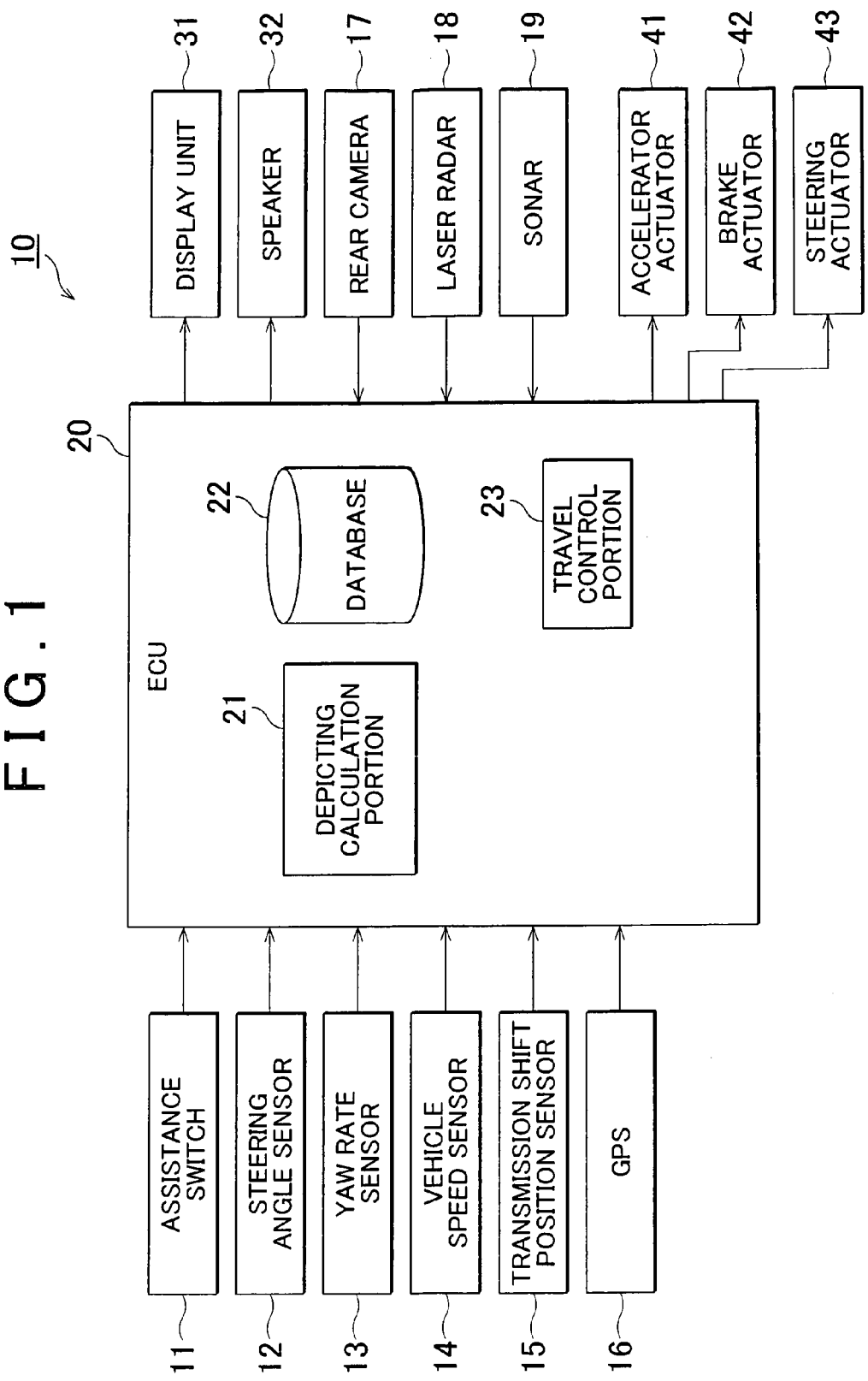
FIG. 1 is a block diagram showing the configuration of a parking assistance apparatus according to an embodiment of the invention.

Hereinafter, a parking assistance apparatus according to an embodiment of the invention will be described with reference to the drawings. A parking assistance apparatus 10 according to the embodiment includes an assistance switch 11, a steering angle sensor 12, a yaw rate sensor 13, a vehicle speed sensor 14, a transmission shift position sensor 15, a Global Positioning System (GPS) 16, a rear camera 17, a laser radar 18, a sonar 19, an Electronic Control Unit (ECU) 20, a display unit 31, a speaker 32, an accelerator actuator 41, a brake actuator 42, and a steering actuator 43.

The assistance switch 11 is operated by a driver to display, in the display unit 31, the image of a scene behind a host vehicle, which is captured by the rear camera 17. In the embodiment, after the assistance switch 11 is turned on by a driver's operation, a travel trajectory and a travel trajectory range, along which the host vehicle is to back up, are displayed in a manner such that the travel trajectory and the travel trajectory range are superimposed on the image of the scene behind the host vehicle in the display unit 31. Note that only the image of the scene behind the host vehicle may be displayed, depending on the driver's operation of the assistance switch 11.

The steering angle sensor 12 detects a steering angle that is the angle of front tires with respect to the longitudinal direction of the host vehicle. The yaw rate sensor 13 detects the yaw rate of the host vehicle using, for example, a gyro sensor. The vehicle speed sensor 14 detects the speed of the host vehicle by detecting the wheel rotational speed of the host vehicle. The transmission shift position sensor 15 detects the shift position of the transmission of the host vehicle, such as a forward drive position "D" and a reverse drive position "R".

The GPS 16 determines the position of the host vehicle, for example, by receiving signals from GPS satellites. In the embodiment, the GPS 16 is not an essential component.

The rear camera 17 captures the image of the scene behind the host vehicle. Each of the laser radar 18 and the sonar 19 recognizes an obstacle, a parking frame, and the like near the host vehicle. The laser radar 18 and the sonar 19 are not essential components in the embodiment.

The Electronic Control Unit (ECU) 20 controls the entire host vehicle. The ECU 20 includes a depicting calculating portion 21, a database 22, and a travel control portion 23. The depicting calculation portion 21 depicts the travel trajectory range along which the host vehicle is to back up in a manner such that the travel trajectory range is superimposed on the image of the scene behind the host vehicle, based on signals from the assistance switch 11, the steering angle sensor 12, the yaw rate sensor 13, the vehicle speed sensor 14, the transmission shift position sensor 15, the GPS 16, the rear camera 17, the laser radar 18, and the sonar 19, and information stored in the database 22.

The database 22 stores information regarding, for example, the turning characteristics of the host vehicle, such as a turning radius, and the overall length, overall width, and overall height of the host vehicle. The database 22 also stores information regarding the parking frame in each parking area, for example, an angle between a direction of forward movement on a path, and the longitudinal direction of the parking frame.

The travel control portion 23 intervenes in a driving operation performed by the driver to provide parking assistance, by driving the accelerator actuator 41, the brake actuator 42, and the steering actuator 43 based on signals from the assistance switch 11, the steering angle sensor 12, the yaw rate sensor 13, the vehicle speed sensor 14, the transmission shift position sensor 15, the GPS 16, the rear camera 17, the laser radar 18, and the sonar 19, and the information stored in the database 22. The travel control portion 23 is not an essential component in the embodiment.

The display unit 31 displays the image of the scene behind the host vehicle, which is captured by the rear camera 17. The display unit 31 also displays the travel trajectory (e.g., trajectories for rear wheels) and the travel trajectory range, along which the host vehicle is to back up, in a manner such that the travel trajectory and the travel trajectory range are superimposed on the image of the scene behind the host vehicle. The display unit 31 may be, for example, an independent liquid crystal display unit for parking assistance. The display unit 31 may be also used as a display unit for a navigation system. The speaker 32 provides parking assistance to the driver using voice.

The accelerator actuator 41, the brake actuator 42, and the steering actuator 43 intervene in the driving operation performed by the driver so as to perform, an accelerator operation, a brake operation, and a steering operation, respectively, in accordance with command signals from the travel control portion 23 of the ECU 20. The accelerator actuator 41, the brake actuator 42, and the steering actuator 43 may intervene in the driving operation performed by the driver, by applying reaction force to an accelerator pedal, a brake pedal, and a steering wheel, respectively, or providing the feel of the accelerator pedal, the feel of the brake pedal, and the feel of the steering wheel, respectively, using a haptic technology. The accelerator actuator 41, the brake actuator 42, and the steering actuator 43 are not essential components in the embodiments.

Figure 2:
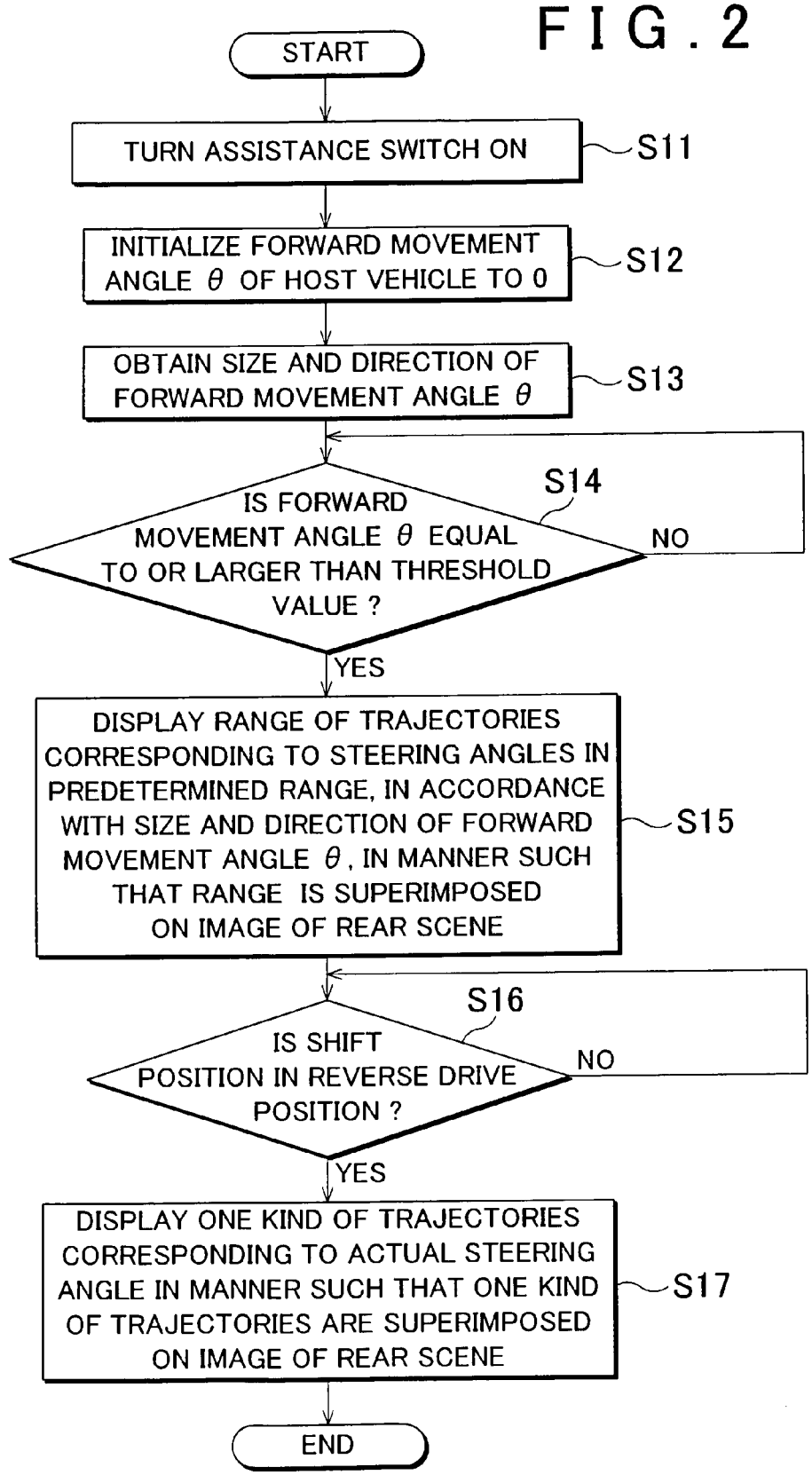
FIG. 2 is a flowchart showing operations of the parking assistance apparatus according to the embodiment.
Figure 3:
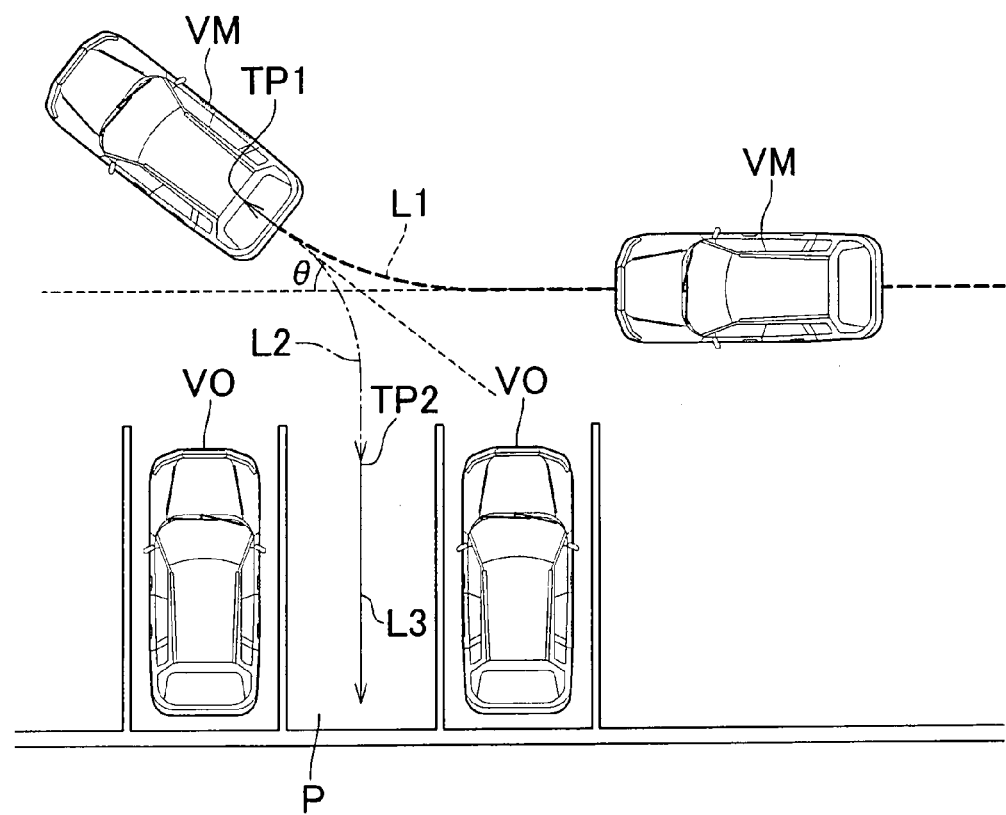
FIG. 3 is a plane view showing a series of operations and trajectories when a vehicle provided with the parking assistance apparatus according to the embodiment is parked in a parking frame.

Hereinafter, the operation of the parking assistance apparatus 10 according to the embodiment will be described. First, the operation will be summarized with reference to FIG. 2 and FIG. 3. As shown in FIG. 3, a situation is assumed, where a host vehicle VM provided with the parking assistance apparatus 10 according to the embodiment is traveling on a path in a parking area. In the example shown in FIG. 3, the angle of 90° is formed by the direction of the path in the parking area and the longitudinal direction of a parking frame P. Another vehicle VO is parked. In this situation, the driver of the host vehicle VM turns the assistance switch 11 on (S11), as shown in FIG. 2. At this time, the image of the scene behind the host vehicle VM, which is captured by the rear camera 17, is displayed in the display unit 31.

According to the operation performed by the driver who sees the indication in the display unit 31, the host vehicle VM moves forward while turning so that a forward movement angle θ is increased to decrease an angle between the longitudinal direction of the parking frame P and the longitudinal direction of the host vehicle VM. The forward movement angle θ is an angle formed by the longitudinal direction of the host vehicle VM and the direction of the path in the parking area. Thus, the host vehicle VM moves along a trajectory L1.

At this time, the trajectory L1 varies according to the operation performed by the driver. The host vehicle VM may travel along the various trajectories L1 at various forward movement angles θ. At this time, the depicting calculation portion 21 of the parking assistance apparatus 10 performs processes (S12 to S14) described below. Thus, the trajectory corresponding to a given steering angle or the range of the trajectories corresponding to given steering angles in a predetermined range is displayed so as to be superimposed on the image of the scene behind the host vehicle VM, which is captured by the rear camera 17, regardless of the actual steering angle of the host vehicle VM at that time (S15).

After the host vehicle VM reaches a steering-wheel turning back point TP1, the host vehicle VM is stopped by the operation performed by the driver who sees the indication in the display unit 31 as a guide. In this case, when it is detected that the shift position of the transmission is in the reverse drive position "R" using the transmission shift position sensor 15 and the like (S16), the depicting calculating portion 21 of the parking assistance apparatus 10 causes the display unit 31 to display one kind of trajectory L2 corresponding to the actual steering angle of the host vehicle VM at that time and one kind of trajectory L3 parallel to the longitudinal direction of the parking frame P in a manner such that the trajectory L2 and the trajectory L3 are superimposed on the image of the scene behind the host vehicle VM (S17). Thus, according to the operation performed by the driver who sees the indication in the display unit 31, the host vehicle VM backs up while turning toward a side opposite to a side toward which the host vehicle VM has turned along the trajectory L1. Thus, the host vehicle VM moves along the trajectory L2. After the host vehicle VM reaches a steering-wheel turning back point TP2, the host vehicle VM backs up at the steering angle of 0° according to the operation performed by the driver who sees the indication in the display unit 31. Thus, the host vehicle VM moves along the trajectory L3. Finally, the host vehicle VM is parked inside the parking frame P.

Figure 4:
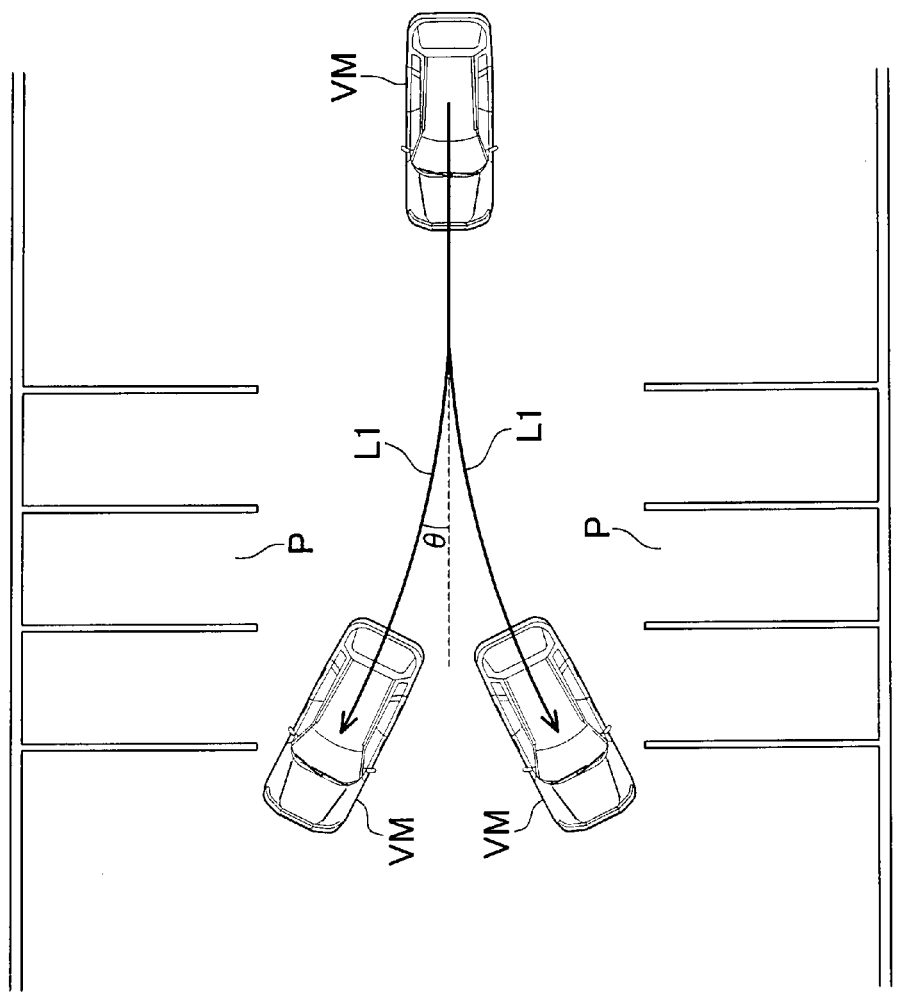
FIG. 4 is a plane view showing a manner in which the vehicle provided with the parking assistance apparatus according to the embodiment enters a parking area.

Hereinafter, each operation will be described in detail. As shown in FIG. 4, in the case where the host vehicle VM enters the parking area where parking frames are provided on both sides of the path, after the assistance switch 11 is turned on (S11), the depicting calculation portion 21 of the ECU 20 of the parking assistance apparatus 10 initializes the forward movement angle θ of the host vehicle VM to 0 (θ=0) (S12). Then, the depicting calculation portion 21 obtains the size and direction of the forward movement angle θ, using the steering angle sensor 12, the yaw rate sensor 13, and the vehicle speed sensor 14, or using the GPS 16 and the information stored in the database 22 (S13).

In this case, when the assistance switch 11 is turned on, the host vehicle V is regarded as traveling in a direction parallel to the direction of the path in the parking area, and the forward movement angle θ is initialized to 0 (θ=0), and then, the size and direction of the forward movement angle θ are obtained based on the values detected by the steering angle sensor 12, the yaw rate sensor 13, and the vehicle speed sensor 14. The size and direction of the forward movement angle θ may be obtained based on the information obtained by the GPS 16 and the information stored in the database 22. Further, in the embodiment, a relation between the longitudinal direction of the parking frame P and the longitudinal direction of the host vehicle VM is determined based on the forward movement angle θ. However, the relation between the longitudinal direction of the parking frame P and the longitudinal direction of the host vehicle VM may be obtained based on, for example, distances between portions of the parking frame P and the host vehicle VM, or a distance or an angle between the other vehicle VO parked in the parking frame P and the host vehicle VM, in addition to, or instead of the forward movement angle θ.

If the forward movement angle θ is equal to or larger than a threshold value (S14), the depicting calculation portion 21 causes the display unit 31 to display the trajectory corresponding to a given steering angle or the range of the trajectories corresponding to given steering angles in the predetermined range, in accordance with the size and direction of the forward movement angle θ, in a manner such that the trajectory or the range of the trajectories is superimposed on the image of the scene behind the host vehicle VM, which is captured by the rear camera 17 (S15).

In the embodiment, the trajectory or the range of the trajectories is displayed to be superimposed on the image of the scene behind the host vehicle VM, which is actually captured by the rear camera 17. However, for the convenience of explanation, the following description will be made on the assumption that the trajectory or the range of the trajectories is virtually displayed in the display unit 31 as an overhead view image on a plane. However, in the embodiment, the image of the scene behind the host vehicle VM may be actually displayed in the display unit 31 as an overhead view image on a plane, and the trajectory, along which the host vehicle VM is to move, may be displayed to be superimposed on the overhead view image. The trajectory, along which the host vehicle VM is to move, may be displayed to be superimposed on a map of a navigation system or the like.

Figure 5:
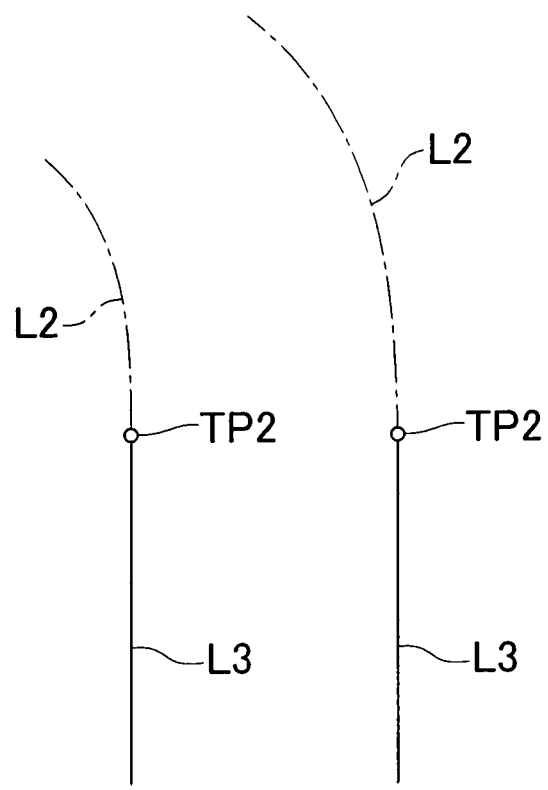
FIG. 5 is a plane view virtually showing trajectories displayed in a display unit of the parking assistance apparatus according to the embodiment.

For example, when the host vehicle VM moves forward on the path in the parking area while turning toward the right side, and thus, the host vehicle VM moves along the trajectory L1, the depicting calculation portion 21 depicts the trajectories L2 along which the paired rear wheels are to move if the host vehicle VM is steered at a given steering angle toward an opposite side, i.e., the left side, as shown in FIG. 5. In each of FIGS. 5 to 21, each kind of trajectory is composed of the trajectories for the paired rear wheels. The trajectories L2 extend rearward from the current position of the host vehicle VM. The trajectories L2 are parallel to the longitudinal direction of the parking frame P at the steering-wheel turning back points TP2 that are the rear end portions of the trajectories L2. The depicting calculation portion 21 also depicts the trajectories L3 along which the paired rear wheels are to move if the host vehicle VM is steered at the steering angle of 0° from the steering-wheel turning back points TP2 that are the rear end portions of the trajectories L2. The trajectories L3 are parallel to the longitudinal direction of the parking frame P.

Figure 6:
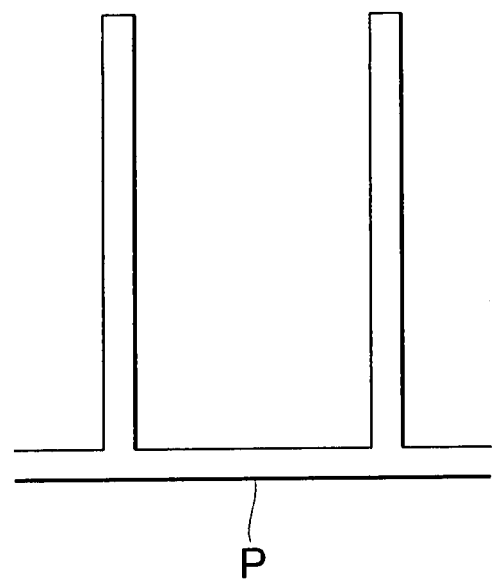
FIG. 6 is a plane view virtually showing the image of the parking frame displayed in the display unit of the parking assistance apparatus according to the embodiment.
Figure 7:
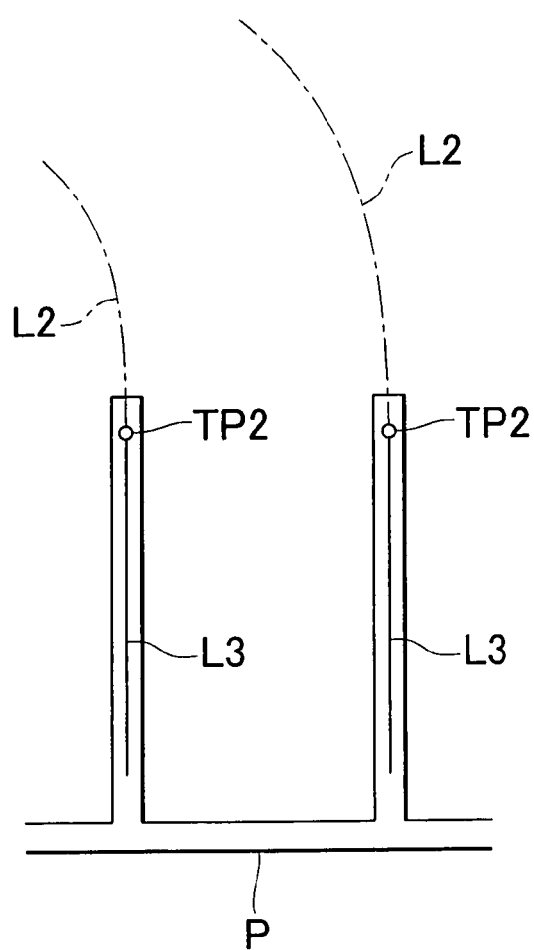
FIG. 7 is a plane view virtually showing the image of the parking frame and the trajectories displayed in a superimposed manner, in the display unit of the parking assistance apparatus according to the embodiment.
Figure 8:
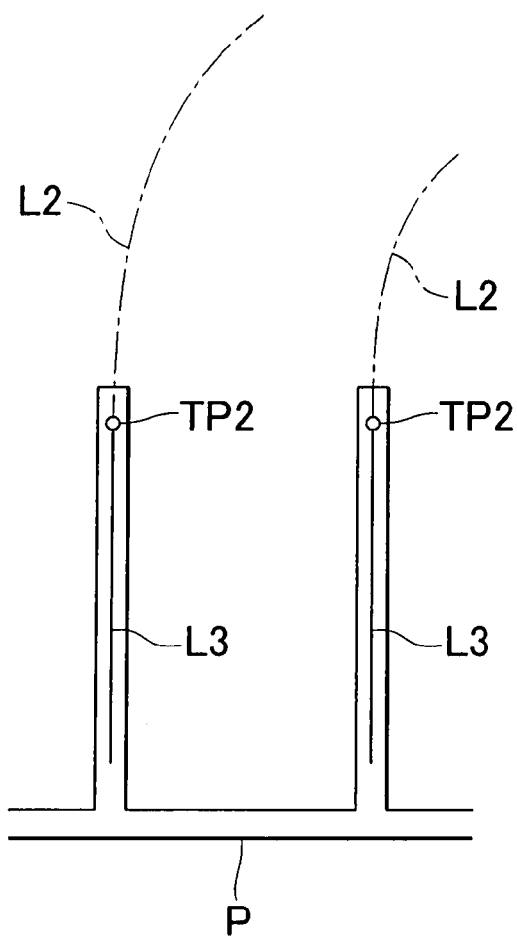
FIG. 8 is a plane view virtually showing the image of the parking frame and the trajectories displayed in the superimposed manner in the display unit, in the case where the vehicle moves forward while turning to the left at the time of entering the parking area.

As shown in FIG. 6, the image of the parking frame P, which is captured by the rear camera 17, is displayed in the display unit 31. As shown in FIG. 7, the depicting calculation portion 21 causes the display unit 31 to display the trajectories L2 and the trajectories L3 in FIG. 5 in a manner such that the trajectories L2 and the trajectories L3 in FIG. 7 are superimposed on the image of the parking frame P in FIG. 6. On the other hand, when the host vehicle VM moves forward on the path in the parking area while turning toward the left side, and thus, the host vehicle VM moves along the trajectory L1, the depicting calculation portion 21 causes the display unit 31 to display the trajectories L2 and the trajectories L3 along which the paired rear wheels are to move if the host vehicle VM is steered at a given steering angle toward the opposite side, that is, toward the right side, as shown in FIG. 8. The depicting calculation portion 21 causes the display unit 31 to display the trajectories L2 and the trajectories L3 in a manner such that the trajectories L2 and the trajectories L3 are superimposed on the image of the parking frame P, as in FIG. 7.

As a method of determining whether the host vehicle VM is to be parked in the parking frame P on the right side or the left side, it is possible to employ a method in which the determination is made based on an input operation performed by the driver. Also, the parking frame P in which the host vehicle VM is to be parked may be set in advance to the parking frame P on the right side or on the left side, in each parking area, based on positioning information obtained by the GPS 16 and the information stored in the database 22.

Figure 9:
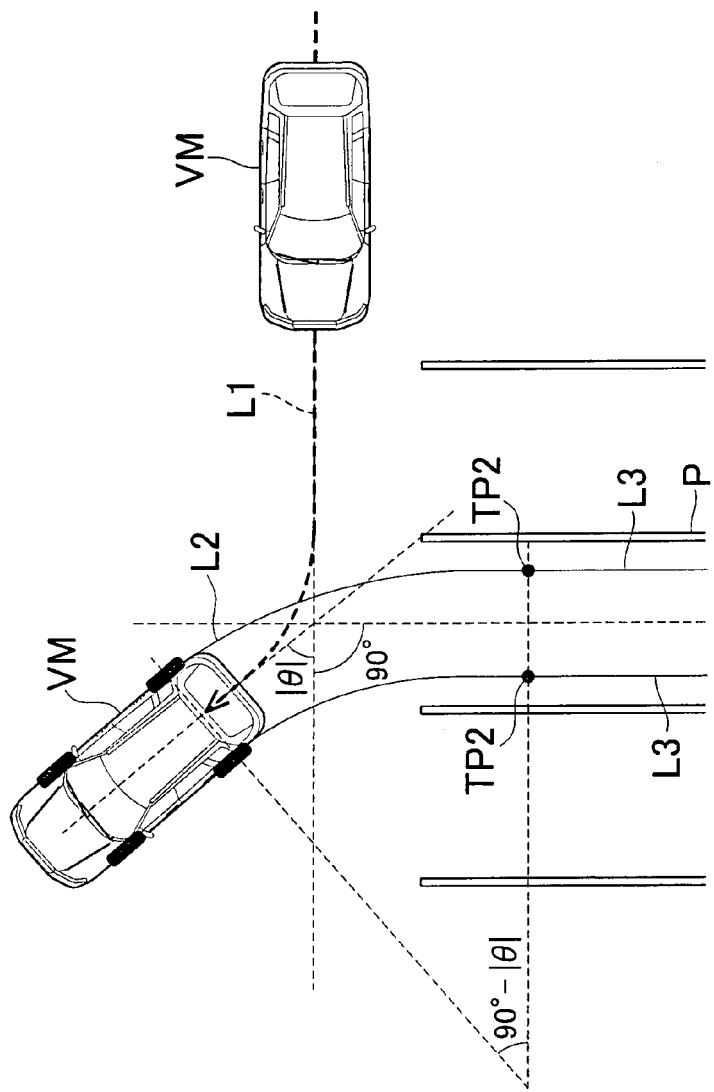
FIG. 9 is a plane view showing a plane view showing a method of depicting trajectories when the direction of the parking frame is at 90° to an entry path in the parking area.

Hereinafter, a method of depicting the trajectories L2 and L3 in the display unit 31 will be described in detail. In the case where the angle of 90° is formed by the direction of the path in the parking area and the longitudinal direction of the parking frame P, the depicting calculation portion 21 depicts arcs corresponding to a given steering angle, the arcs extending from the paired rear wheels of the host vehicle VM, and the center angle of the arcs being (90°−the forward movement angle |θ|, as shown in FIG. 9. Thus, the depicting calculation portion 21 depicts the trajectories L2 whose end portions are parallel to the longitudinal direction of the parking frame P. The depicting calculation portion 21 depicts the trajectories L3 by depicting straight lines that extend from the rear end portions of the trajectories L2 in the same direction as the direction in which the rear end portions of the trajectories L2 extend.

Figure 10:
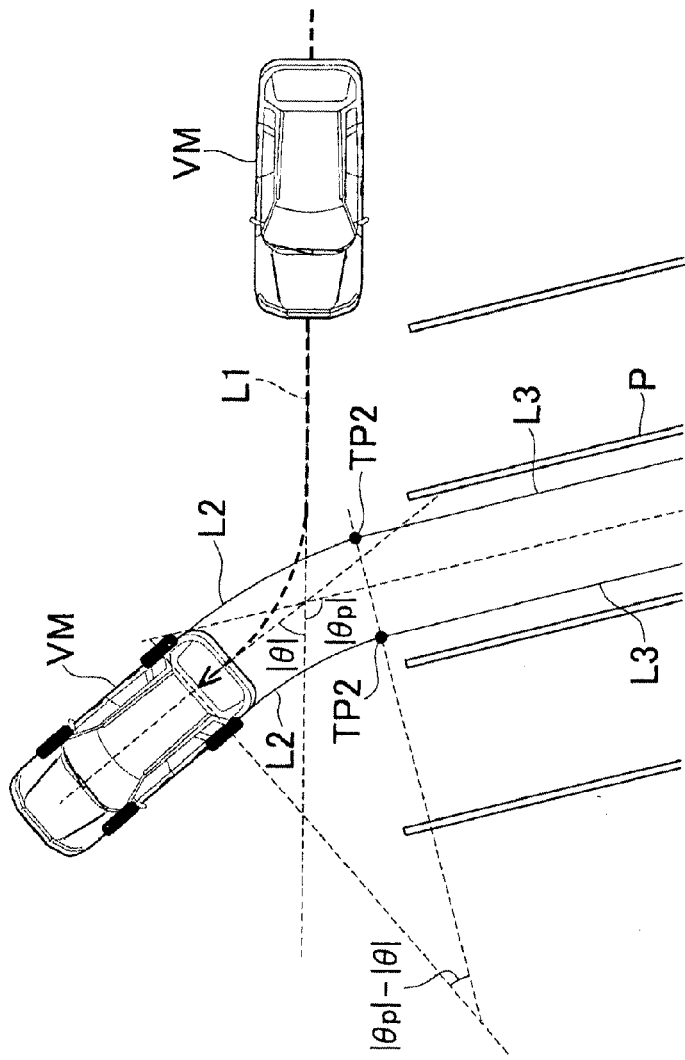
FIG. 10 is a plane view showing the method of depicting the trajectories when the direction of the parking frame is not at 90° to the entry path in the parking area.

In the case where an angle |θp| other than 90° is formed by the direction of the path in the parking area and the longitudinal direction of the parking frame P, that is the longitudinal direction of the parking frame P is inclined with respect to the direction of the path in the parking area, the depicting calculation portion 21 depicts arcs corresponding to a given steering angle, the arcs extending from the paired rear wheels of the host vehicle VM, and the center angle of the arcs being (|θp|−the forward movement angle |θ|), as shown in FIG. 10. Thus, the depicting calculation portion 21 depicts the trajectories L2 whose end portions are parallel to the longitudinal direction of the parking frame P. The depicting calculation portion 21 depicts the trajectories L3 in the same manner as in the case where the angle of 90° is formed by the direction of the path in the parking area and the longitudinal direction of the parking frame P.

By employing the method shown in FIG. 9 and FIG. 10, the depicting calculation portion 21 causes the display unit 31 to display the trajectories L2 in a manner such that a curved portion of each trajectory L2 is increased with increase in an angle formed by the longitudinal direction of the parking frame P in which the host vehicle VM is to be parked and the longitudinal direction of the host vehicle VM, and the curved portion of each trajectory L2 is decreased with decrease in the angle formed by the longitudinal direction of the parking frame P in which the host vehicle VM is to be parked and the longitudinal direction of the host vehicle VM.

In the case where the direction of the path in the parking area is the same as the longitudinal direction of the parking frame, that is, in the case of parallel parking, the depicting calculation portion 21 may inform the driver of the host vehicle VM of a back-up start position at which the host vehicle VM should start to back up, by superimposing trajectories obtained by combining two arcs and straight lines, on the image of the parking frame P in the display unit 31. The center angles of the two arcs are the same. One of the arcs extends toward the right side and the other of the arcs extends toward the left side.

The parking assistance apparatus 10 may recognize the parking frame P and the other vehicle VO using the laser radar 18, the sonar 19, and the like, and may, inform the driver of the host vehicle VM of the back-up start position at which the host vehicle VM should start to back up, using the voice of the speaker 32. Also, the parking assistance apparatus 10 may forcibly intervene in the driving operation performed by the driver of the host vehicle VM, to inform the driver of the host vehicle VM of the back-up start position, using the travel control portion 23, the brake actuator 42, and the steering actuator 43. Further, the parking assistance apparatus 10 may inform the driver of the host vehicle VM of the back-up start position by using the travel control portion 23, the accelerator actuator 41, and the steering actuator 43 to apply the reaction force to the accelerator pedal and the steering wheel, or to provide the feel of the accelerator pedal and the feel of the steering wheel using a haptic technology.

Also, after the host vehicle VM stops at the back-up start position such as the steering-wheel turning back point TP1, the parking assistance apparatus 10 may cause the display unit 31 to display the image of the scene behind the host vehicle VM, and the driver of the host vehicle VM may set the parking frame P in which the host vehicle VM is to be parked, and may set the trajectories L2 and L3 along which the host vehicle VM is to back up. Also, even if the driver forgets to operate the assistance switch 11, the parking assistance apparatus 10 may recognize the parking frame P and the other vehicle VO and may estimate the forward movement angle θ and the longitudinal direction of the parking frame P using the laser radar 18, the sonar 19, the GPS 16, the information stored in the database 22, and the like, when the host vehicle VM moves forward on the trajectory L1, and the parking assistance apparatus 10 may display the trajectories L2 and L3 in a manner such that the trajectories L2 and L3 are superimposed on the image of the parking frame P, as in the case where the assistance switch 11 is operated.

The trajectories L2 and L3, which do not correspond to the current steering angle of the host vehicle VM, and which are based on the angle formed by the longitudinal direction of the host vehicle VM and the longitudinal direction of the parking frame P, are displayed at least when the host vehicle VM is in a stopped state or when the host vehicle VM is moving forward, and may be constantly displayed also when the host vehicle VM is backing up. Alternatively, as described above, when the host vehicle VM is backing up, only one kind of trajectories L2 and one kind of trajectories L3, which correspond to the actual steering angle of the host vehicle VM at that time, may be displayed in the display unit 31, and the trajectories L2 and L3, which do not correspond to the current steering angle of the host vehicle VM, and which are based on the angle formed by the longitudinal direction of the host vehicle VM and the longitudinal direction of the parking frame P, may be erased from the display unit 31.

Although it is determined whether the host vehicle VM is moving forward, is in the stopped state, or is backing up, based on the value detected by the transmission shift position sensor 15 in the above-described embodiment, it may be determined whether the host vehicle VM is moving forward, is in the stopped state, or is backing up, based on, for example, the operation of the accelerator pedal, the brake, or the like, or a value detected by the vehicle speed sensor 14 or the GPS 16.

Figure 11:
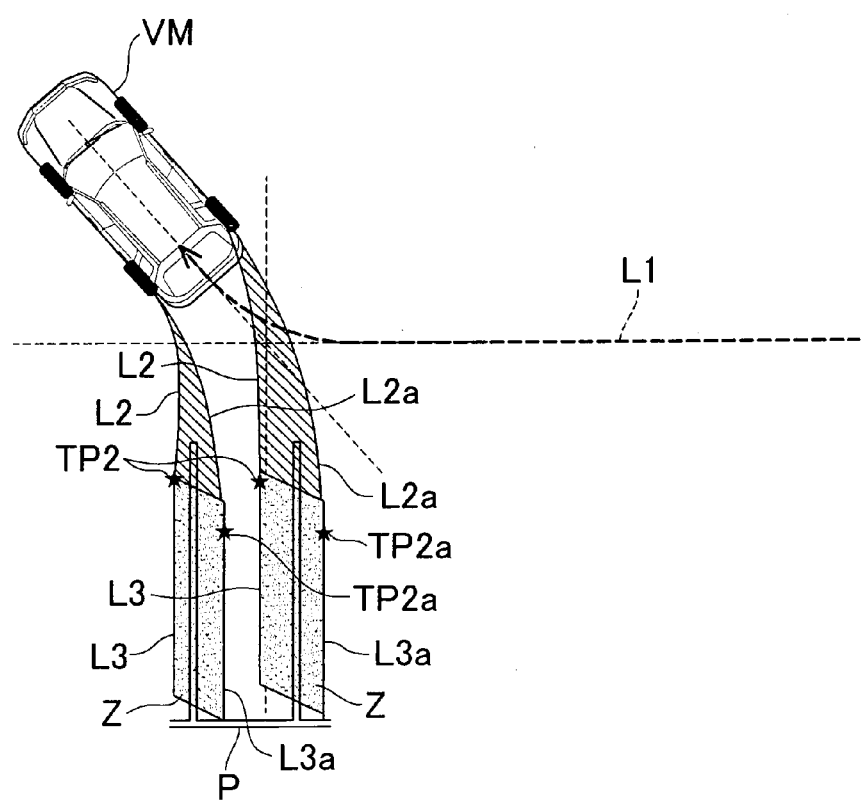
FIG. 11 is a plane view virtually showing the image of the parking frame and trajectory ranges corresponding to steering angles in a predetermined range, the image of the parking frame and the trajectory ranges being displayed in a superimposed manner in the display unit of the parking assistance apparatus according to the embodiment.

As shown in FIG. 7 to FIG. 10, the depicting calculation portion 21 may cause the display unit 31 to display one kind of trajectories L2 and one kind of trajectories L3. In the embodiment, however, the depicting calculation portion 21 may cause the display unit 31 to display the ranges of the trajectories L2 including arcs with different turning radii (i.e., arcs corresponding to different steering angles) and the trajectories L3 continuous with the respective trajectories L2. As shown in FIG. 11, the depicting calculation portion 21 may cause the display unit 31 to display, for example, the trajectories L2 corresponding to a steering angle αA that is the maximum steering angle, and trajectories L2a corresponding to a steering angle αB that is 70% of the maximum steering angle. Trajectories L3 and L3a in the form of straight lines extend from steering-wheel turning back points TP2 and TP2a, respectively. The steering-wheel turning back points TP2 and TP2a are rear end portions of the trajectories L2 and L2a, respectively. The depicting calculation portion 21 causes the display unit 31 to display trajectory ranges Z for the respective rear wheels using hatching, in a manner such that the trajectory ranges Z are superimposed on the image of the parking frame P. Each of the trajectory ranges Z is defined by the trajectories L2 to L3a. More specifically, the display unit 31 displays the trajectory ranges Z for the respective rear wheels, in a manner such that the trajectory ranges Z are superimposed on the image of the scene behind the host vehicle VM, and each of the trajectory ranges Z is defined by the trajectories L2 to L3a for one of the rear wheels. The trajectories L2 to L3 and the trajectories L2a to L3a correspond to different steering angles.

Figure 12:
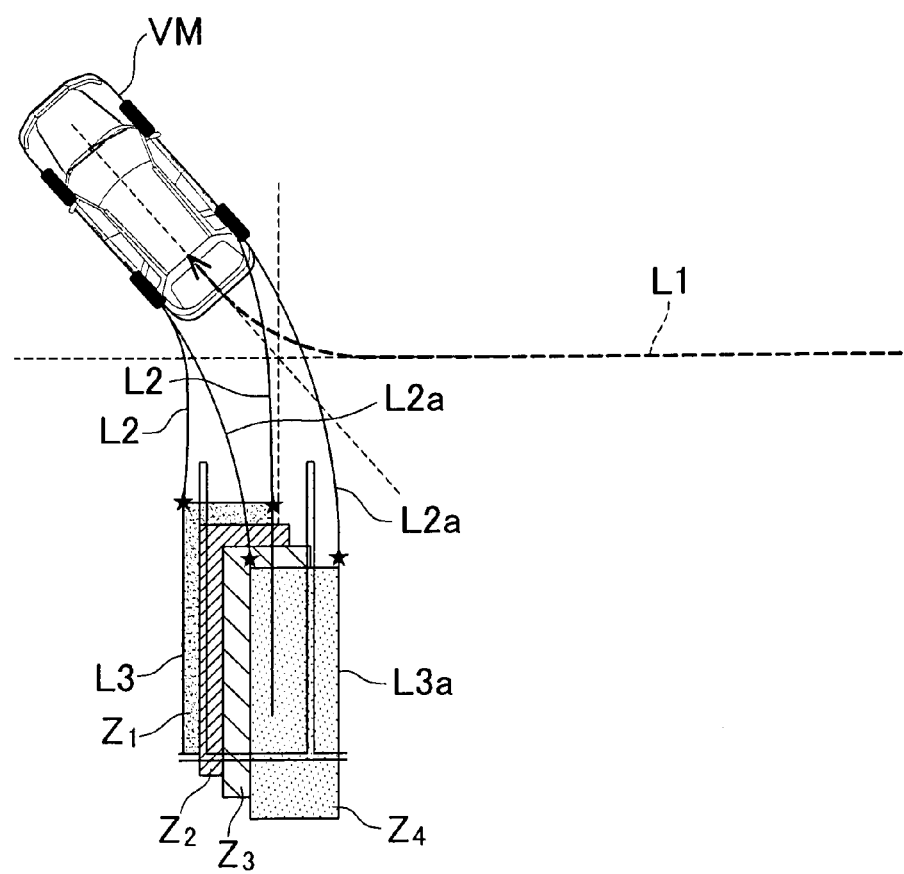
FIG. 12 is a view showing another example of the indication shown in FIG. 11.

Also, as shown in FIG. 12, the depicting calculation portion 21 may cause the display unit 31 to display a trajectory range $Z_1$ for the paired rear wheels, and a trajectory range $Z_4$ for the paired rear wheels using hatching, in a manner such that the trajectory range $Z_1$ and the trajectory range $Z_4$ are superimposed on the image of the parking frame P. The trajectory range $Z_1$ is defined by the trajectories L2 and L3. The trajectory range $Z_4$ is defined by the trajectories L2a and L3a. Further, the depicting calculation portion 21 may cause the display unit 31 to display trajectory ranges $Z_2$ and $Z_3$ for the paired rear wheels by similarly depicting trajectories corresponding to each of predetermined steering angles between the trajectories L2 and L2a. Each of the trajectory ranges $Z_2$ and $Z_3$ is defined by the trajectories for the paired rear wheels. More specifically, the display unit 31 displays the trajectory ranges $Z_1$, $Z_2$, $Z_3$, and $Z_4$ for the paired rear wheels, in a manner such that the trajectory ranges $Z_1$, $Z_2$, $Z_3$, and $Z_4$ are superimposed on the image of the scene behind the host vehicle VM, and each of the trajectory ranges $Z_1$, $Z_2$, $Z_3$, and $Z_4$ is defined by the trajectories for the paired rear wheels, the trajectories corresponding to one steering angle. Thus, it is possible to indicate, to the driver, a plurality of possible back-up start positions at which the host vehicle VM may start to back up. In each of the cases shown in FIG. 11 and FIG. 12, it is possible to allow the driver to easily see the trajectory range Z and the like superimposed on white lines, by filling in the trajectory range Z and the like in a manner such that the white lines of the parking frame P are visible through the trajectory range Z and the like.

In the embodiment, in the case where the ranges of the trajectories L2 including arcs having different turning radii (i.e., arcs at different steering angles) and the trajectories L3 continuous with the respective trajectories L2 are displayed, the steering angle for the trajectories L2 (i.e., the curvature of the arcs of the trajectories L2) may be changed in accordance with the forward movement angle θ as described above. In this case, if the arcs of the trajectories L2 are depicted at the steering angle α2, and the arcs of the trajectories L2a are depicted at the steering angle α1 in FIG. 11 or FIG. 12, the steering angle α1 is smaller than the steering angle α2 (α1<α2) as shown in each of FIG. 11 and FIG. 12. In this case, the steering angles α1 and α2 may be set, for example, as shown in FIG. 13. The minimum value α2min of the steering angle α2 is smaller than the maximum value α2max of the steering angle α2 (α2min<α2max). The minimum value α1min of the steering angle α1 is smaller than the maximum value α1max of the steering angle α1 (α1min<α1max). However, the minimum value α2min is not necessarily smaller than the maximum value α1max.

In FIG. 13, for example, a forward movement angle θ1 is 15°, and a forward movement angle θ2 is 45°. In a range where the forward movement angle θ is larger than 0 and smaller than θ1 (0<θ<θ1), the forward movement angle θ is small and the angle formed by the longitudinal direction of the parking frame P and the longitudinal direction of the host vehicle VM is large. Therefore, the steering angle α1 and the steering angle α2 are set to the maximum value α1max and the maximum value α2max, respectively (α1=α1max, α2=α2max), and the steering angle α1 and the steering angle α2 are not changed. In a range where the forward movement angle θ is larger than θ1 and smaller than θ2 (θ1<θ<θ2), as the forward movement angle θ increases, and as the angle formed by the longitudinal direction of the parking frame P and the longitudinal direction of the host vehicle VM decreases, both of the steering angles α1 and α2 are decreased. In a range where the forward movement angle θ is larger than θ2 (θ>θ2), the forward movement angle θ is large and the angle formed by the longitudinal direction of the parking frame P and the longitudinal direction of the host vehicle VM is small. Therefore, the steering angle α1 and the steering angle α2 are set to the minimum value α1min and the minimum value α2min, respectively (α1=α1min, α2=α2min), and the steering angle α1 and the steering angle α2 are not changed.

In addition to the case where the forward movement angle θ gradually increases as the host vehicle VM moves forward, there is a case where the forward movement angle θ sharply and frequently increases and decreases when the steering operation performed by the driver frequently changes. In the case where the forward movement angle θ sharply and frequently changes, if the steering angles for the trajectories L2 and L2a are changed in accordance with the change in the forward movement angle θ, the trajectories L2 and L2a, which are references for the driver, are sharply changed, and therefore, it is hard for the driver to see the trajectories L2 and L2a. As a result, it may be difficult for the driver to stop the host vehicle VM at the appropriate steering-wheel turning back point TP1. Thus, in the embodiment, the configuration may be such that when the amount of change in the forward movement angle θ per unit time is larger than a predetermined threshold value, the steering angles for the trajectories L2 and L2a are not changed.

Figure 14:
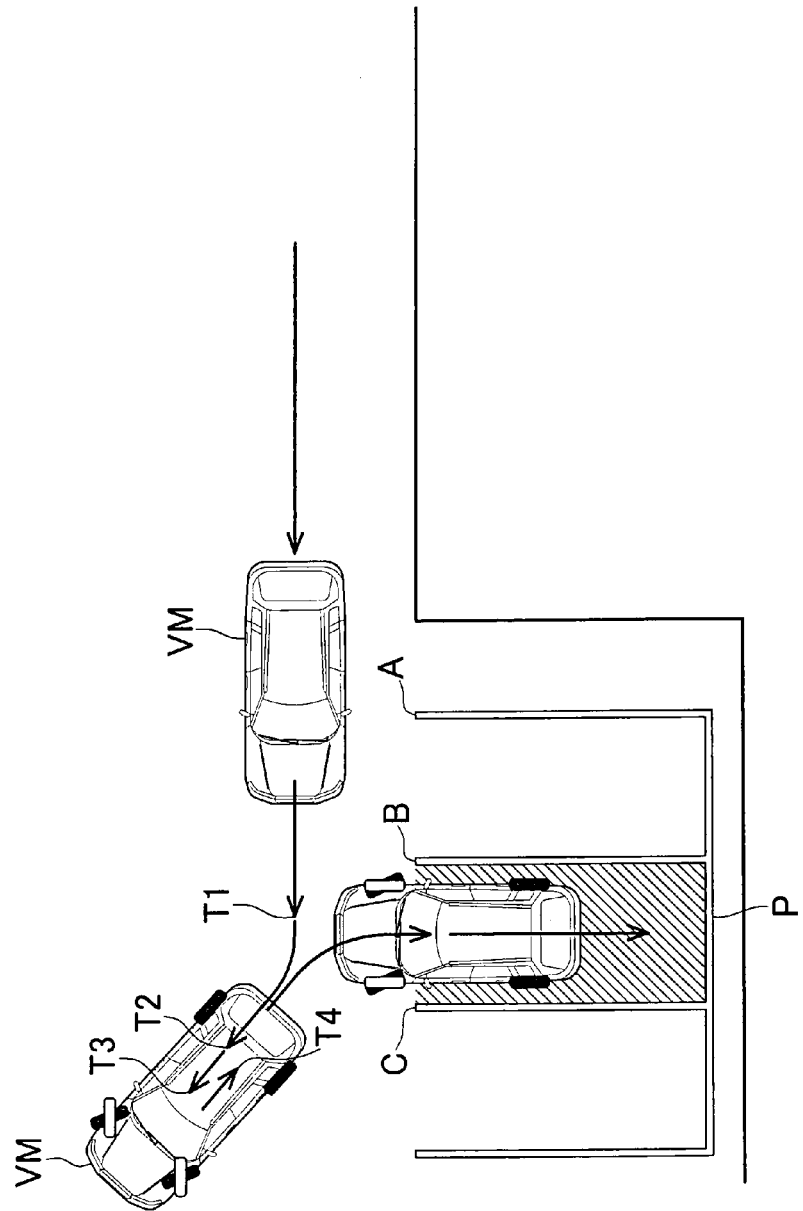
FIG. 14 is a plane view showing positions of the host vehicle in FIG. 3 at time points T1 to T4.

Hereinafter, an example of the image that is actually displayed in the display unit 31 in the parking assistance apparatus 10 according to the embodiment will be described. The following description will be made on the assumption that the host vehicle VM is parked in the parking frame P including white lines A to C, as shown in FIG. 14. When the driver turns the assistance switch 11 on while the host vehicle VM is moving straight on the path in the parking area, the image of the scene behind the host vehicle VM, which is captured by the rear camera 17, is displayed in the display unit 31 as shown in FIG. 15.

In the embodiment, basically, the depicting calculation portion 21 starts to cause the display unit 31 to display the trajectories L2 and L3 and the trajectory ranges Z in a superimposed manner after the parking frame P is displayed in the image of the display unit 31, unless a specific operation is performed by the driver. The depicting calculation portion 21 may start to cause the display unit 31 to display the trajectories L2 and L3 and the trajectory ranges Z in the superimposed manner after the parking frame P is displayed in the image in the display unit 31, by starting to cause the display unit 31 to display the trajectories L2 and L3 and the trajectory ranges Z after the forward movement angle θ becomes equal to or larger than the predetermined threshold value as described above. Alternatively, the depicting calculation portion 21 may estimate a time point at which the parking frame P is displayed in the image in the display unit 31 and an area in which the parking frame P is displayed in the image in the display unit 31, by recognizing the parking frame P using the laser radar 18, the sonar 19, the GPS 16, the database 22, and the like, and thus, the depicting calculation portion 21 may start to cause the display unit 31 to display the trajectories L2 and L3 and the trajectory ranges Z in the superimposed manner after the parking frame P is displayed in the image in the display unit 31. In this case, the trajectories L2 and L3 may be displayed immediately before the parking frame P, in which the host vehicle VM is to be parked, is displayed in the image of the scene behind the host vehicle VM, or may be displayed at the time point at which the parking frame P, in which the host vehicle MV is to be parked, is displayed in the image of the scene behind the host vehicle VM.

Figure 16:
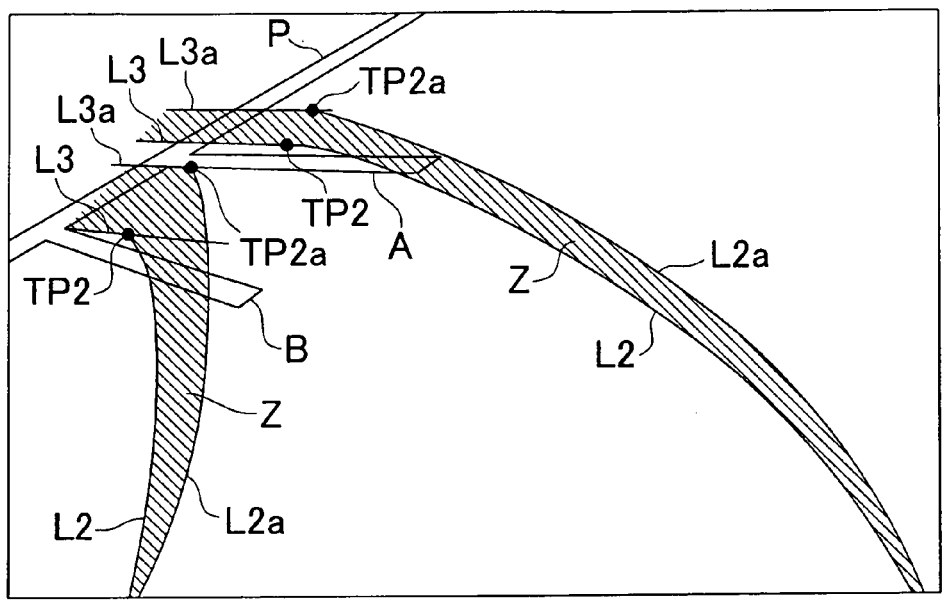
FIG. 16 is a view showing the image of the parking frame and the trajectories, which are actually displayed in the display unit of the parking assistance apparatus according to the embodiment, at the time point T1 in FIG. 14.
Figure 17:
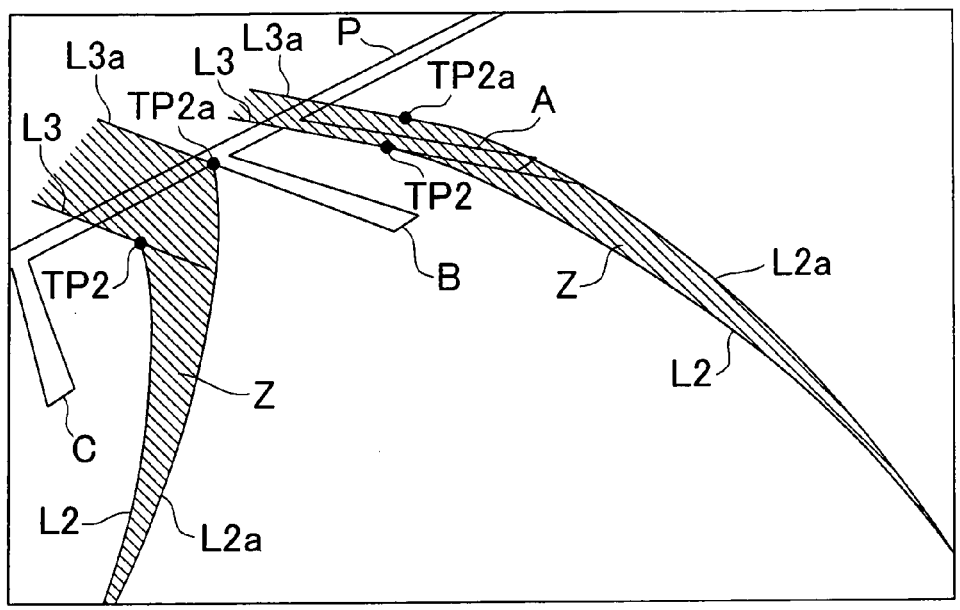
FIG. 17 is a view showing the image of the parking frame and the trajectories, which are actually displayed in the display unit of the parking assistance apparatus according to the embodiment, at the time point T2 in FIG. 14.
Figure 18:
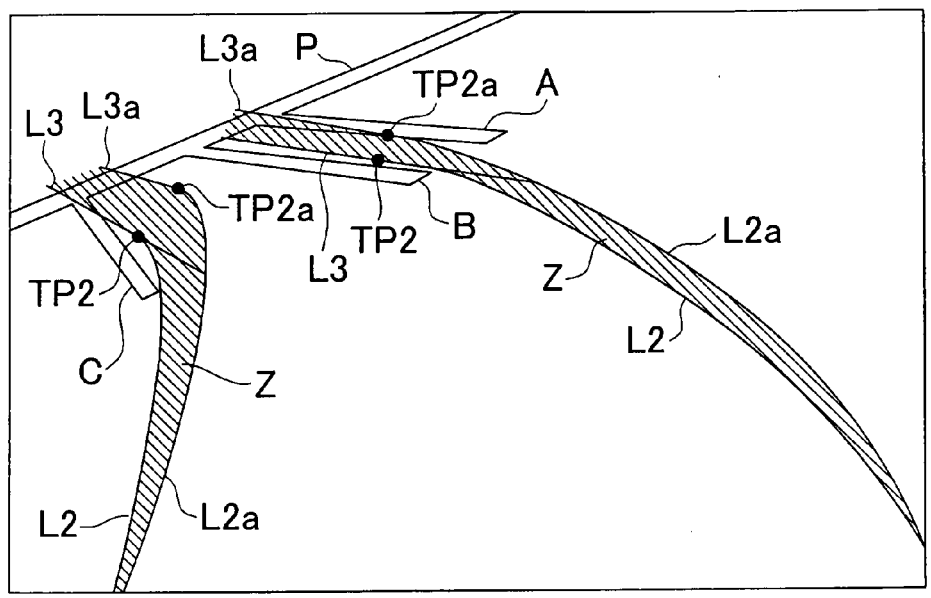
FIG. 18 is a view showing the image of the parking frame and the trajectories, which are actually displayed in the display unit of the parking assistance apparatus according to the embodiment, at the time point T3 in FIG. 14.

When the forward movement angle θ becomes larger than the threshold value at a time point T1, the depicting calculation portion 21 causes the display unit 31 to display the trajectories L2 to L3a and the trajectory ranges Z in a manner such that the trajectories L2 to L3a and the trajectory ranges Z are superimposed on the image of the rear scene in which the parking frame P is displayed, as shown in FIG. 16. As time elapses from a time point T2 to a time point T3, and as the forward movement angle θ increases, curved portions of the trajectories L2 and L2a are decreased as shown in FIG. 17 and FIG. 18.

Figure 19:
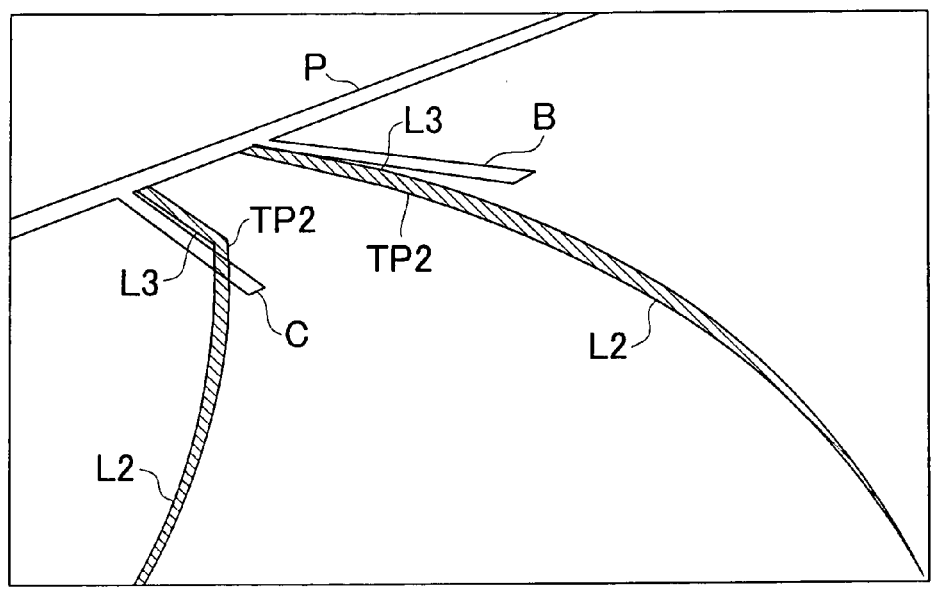
FIG. 19 is a view showing the image of the parking frame and the trajectories, which are actually displayed in the display unit of the parking assistance apparatus according to the embodiment, at the time point T4 in FIG. 14.

At the time point T3, the driver, who sees the parking frame P and the trajectory ranges Z in the display unit 31, determines that the host vehicle VM has reached the back-up start position, and stops the host vehicle VM. Then, the driver backs up the host vehicle VM. At a time point T4 at which the host vehicle VM starts to back up, the depicting calculation portion 21 causes the display unit 31 to display only one kind of trajectories L2 and one kind of trajectories L3 corresponding to the actual steering angle detected by the steering angle sensor 12, as shown in FIG. 19. When the actual steering angle is changed, the trajectories L2 and L3 are also changed and displayed in the display unit 31, in accordance with the change in the actual steering angle.

In general, when the vehicle is to be parked in the parking frame, a predetermined angle, such as the angle of 90°, is formed by the direction in which the vehicle moves forward on the path in the parking area, and the longitudinal direction of the parking frame, in most cases. Therefore, in general, the vehicle is usually parked in the parking frame in the following manner. First, the vehicle moves forward while turning, and thus, the angle formed by the longitudinal direction of the vehicle and the longitudinal direction of the parking frame is decreased. Then, the vehicle backs up while turning toward the opposite side. However, in the technology described in the above-described Japanese Patent Application Publication No. 2001-213253, when the vehicle moves forward and when the vehicle is stopped, only one guidance trajectory, along which the vehicle is estimated to move if the vehicle backs up with the steering angle being fixed to the maximum steering angle, is displayed. Therefore, the range of positions, from which the back-up start position is selected, is extremely small. The back-up start position is a point at which the vehicle should start to back up, that is, a point at which the vehicle should be temporarily stopped after moving forward. In other words, if the vehicle passes the back-up start position, that is, a temporary stop point, on the guidance trajectory corresponding to the maximum steering angle, it may not be possible to provide effective parking assistance depending on the guidance trajectory. Also, in the above-described technology, because the guidance trajectory is always displayed when the vehicle is moving forward and when the vehicle is stopped, it is difficult for the driver to recognize the back-up start position.

In contrast, in the embodiment, when the host vehicle VM moves forward, the depicting calculation portion 21 causes the display unit 31 to display the trajectory ranges Z that includes the plurality of kinds of trajectories L2 to L3a, along which the host vehicle VM is able to back up from the current position, in a manner such that the trajectory ranges Z are superimposed on the image of the scene behind the host vehicle VM. Therefore, the driver is able to select the trajectories from among the plurality of trajectories L2 to L3a corresponding to, for example, different steering angles. Therefore, for example, even if the host vehicle VM passes the point from which the host vehicle VM is able to back up at the maximum steering angle into the parking frame P, variation in the back-up start position is accommodated and the host vehicle VM is easily parked in the parking frame P, by selecting the trajectories from among the plurality of trajectories corresponding to, for example, different steering angles.

More specifically, in the case where only one arc with a given turning radius is depicted, when the host vehicle VM freely moves forward along the trajectory L1, the trajectories L2 and L3 overlap with the parking frame P at only one point. Thus, the host vehicle VM may pass the stop position at which the host vehicle VM should start to back up, and accordingly, it may be difficult to stop the host vehicle VM. In contrast, in the embodiment, the parking assistance apparatus 10 informs the driver of a plurality of possible stop positions, that is, there is flexibility in selecting the stop position. Therefore, the host vehicle VM is easily stopped at the stop position, that is, the back-up start position. Also, in the embodiment, even in a situation where the parking frame P is not clearly indicated by white lines or the like, the driver is able to recognize the appropriate back-up start position by adjusting the superimposed trajectories L2 and L3 to a target parking position displayed in the display unit 31. Further, in the embodiment, the driver is able to recognize, from a position distant from the parking frame P, the parking position and the back-up start position by adjusting the lengths of the trajectories, L3 and L3a in the form of straight lines.

In the embodiment, the depicting calculation portion 21 causes the display unit 31 to display the trajectories L2 and the like corresponding to the steering angles of the host vehicle VM, which are changed in accordance with the angle formed by the longitudinal direction of the parking frame P in which the host vehicle VM is to be parked, and the longitudinal direction of the host vehicle VM. Therefore, even when the angle formed by the longitudinal direction of the parking frame P and the longitudinal direction of the host vehicle VM varies, the trajectories L2 and the like and the parking frame P easily overlap with each other, and thus, the driver is able to easily recognize the trajectories along which the host vehicle VM should back up. Also, in the case where the host vehicle VM is to be parked, before the host vehicle VM backs up into the parking frame P, the host vehicle VM turns while moving forward, so that the angle formed by the longitudinal direction of the parking frame P and the longitudinal direction of the host vehicle VM is freely adjusted. Thus, while seeing the trajectories L2 and the like corresponding to the steering angles that are changed in accordance with the angle formed by the longitudinal direction of the parking frame P and the longitudinal direction of the host vehicle VM, the driver is able to easily move the host vehicle VM to the back-up start position (i.e., the steering-wheel turning back point TP1) at which the driver is able to easily see the parking frame P and the trajectories L2 and the like, and from which the host vehicle VM easily backs up into the parking frame P.

Particularly, in the embodiment, the depicting calculation portion 21 causes the display unit 31 to display the trajectories L2 and the like corresponding to the steering angles of the host vehicle VM, which are increased with increase in the angle formed by the longitudinal direction of the parking frame P in which the host vehicle VM is to be parked and the longitudinal direction of the host vehicle VM. Therefore, even when the angle formed by the longitudinal direction of the parking frame P and the longitudinal direction of the host vehicle VM is large, the trajectories L2 and the like and the parking frame P easily overlap with each other. Thus, the driver is able to easily recognize the trajectories along which the host vehicle VM should back up. Also, even when the angle formed by the longitudinal direction of the parking frame P and the longitudinal direction of the host vehicle VM is large, the driver is able to easily see the parking frame P and the trajectories L2 and the like, and thus, the driver is able to easily move the host vehicle VM to the back-up start position from which the host vehicle VM easily backs up into the parking frame P.

Figure 20:
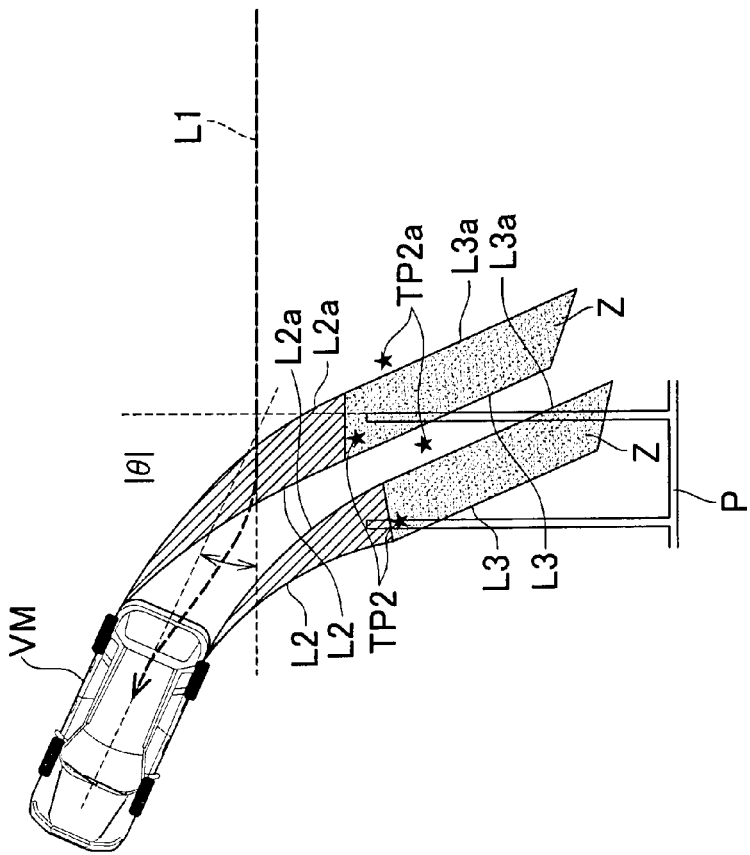
FIG. 20 is a plane view showing a situation where the depicted trajectories are not changed in accordance with the forward movement angle.

If the depicted trajectories are not changed in accordance with the forward movement angle θ, and the forward movement angle θ is small as shown in FIG. 20, it is difficult to overlap the trajectory ranges Z with the parking frame P, and thus, the host vehicle VM may excessively move forward. In this case, because the host vehicle VM is distant from the parking frame P, it may be difficult for the driver to visually recognize the parking frame P in the image of the scene behind the host vehicle VM. If the trajectories L2 corresponding to a constant steering angle continue to be displayed, the driver may determine that the driver is not able to back up the host vehicle VM into the parking frame P according to the guidance using the trajectory ranges Z displayed during forward movement, and may determine that the host vehicle VM is located outside a range in which the system provides assistance, even in the case where actually, the driver is able to park the host vehicle VM in the parking frame P by backing up the host vehicle VM only once at the maximum steering angle or the like. Particularly in a small parking area, the forward movement angle θ cannot be made large, and therefore, the driver may determine that the host vehicle is located outside the range where the system provides assistance.

Figure 21:
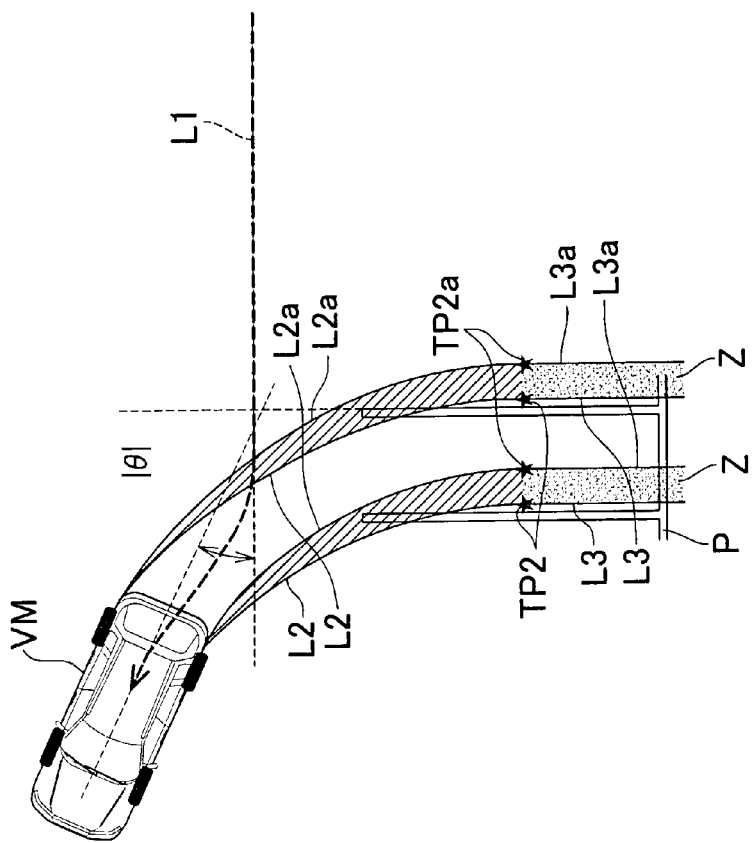
FIG. 21 is a plane view showing a situation where the depicted trajectories are changed in accordance with the forward movement angle.

In contrast, in the embodiment, the trajectories L2 and the like corresponding to the steering angles changed in accordance with the forward movement angle θ are displayed as shown in FIG. 21. Therefore, the trajectories L2 and the like easily overlap with the parking frame P, and thus, the driver is able to easily see the parking frame P and the trajectories L2 and the like. Accordingly, the driver is able to easily move the host vehicle VM to the back-up start position from which the host vehicle VM easily backs up into the parking frame P. Even in the case where the parking area is small, and it is difficult to make the forward movement angle θ large by turning the host vehicle VM once, and it is difficult to park the host vehicle VM in the parking frame P by backing up the host vehicle VM once, the trajectory ranges Z, in which the curved portions extend to the points at which the curved portions are parallel to the longitudinal direction of the parking frame P, are depicted as shown in FIG. 21. Therefore, the driver is able to easily park the host vehicle VM in the parking frame P by referring to the trajectory ranges Z and turning the steering wheel back and forth.

In the embodiment, the depicting calculation portion 21 causes the display unit 31 to display the image of the scene behind the host vehicle VM. The depicting calculation portion 21 causes the display unit 31 to display the trajectories L2 and L3 and the like along which the host vehicle VM is to back up from the point at which the host vehicle VM is currently positioned, in a manner such that the trajectories L2 and L3 and the like are superimposed on the image of the scene behind the host vehicle VM, in accordance with the time point at which the parking frame P, in which the host vehicle VM is to be parked, is displayed in the image of the scene behind the host vehicle VM. For example, the depicting calculation portion 21 causes the display unit 31 to display the trajectories L2 and L3 and the like after the time point at which the parking frame P is displayed. Therefore, the driver is able to easily recognize the back-up start position at which the host vehicle VM should start to back up, and thus, the driver is able to easily park the host vehicle VM in the parking frame P, as compared to when employing an apparatus in which trajectories along which the host vehicle VM is to back up are displayed although the parking frame P is not displayed. The phrase "the trajectories L2 and L3 and the like are displayed in accordance with a time point at which the parking frame P is displayed" signifies that the time point at which the parking frame P is displayed does not necessarily coincide with the time point at which the trajectories L2 and L3 and the like are displayed. The configuration may be such that the trajectories L2 and L3 and the like are displayed immediately before a situation where the parking frame P is displayed occurs, or the configuration may be such that the trajectories L2 and L3 and the like are displayed after a certain time elapses after the parking frame P is displayed. In each configuration, when the host vehicle VM is far from the parking frame P, the trajectories are not displayed. This reduces the possibility that the driver feels annoyed by the trajectories being displayed when the host vehicle VM is far from the parking frame P. It is possible to determine whether the trajectories L2 and L3 and the like should be displayed, by using the forward movement angle θ, by recognizing the image of an environment around the host vehicle VM, such as the parking frame P, or by employing a recognition technology using map information and positional information.

In the embodiment, the depicting calculation portion 21 causes the display unit 31 to display the image of the scene behind the host vehicle VM. When the host vehicle VM moves forward, the depicting calculation portion 21 causes the display unit 31 to display the trajectories L2 and L3 along which the host vehicle VM is to back up from the point at which the host vehicle VM is currently positioned, in a manner such that the trajectories L2 and L3 are superimposed on the image of the scene behind the host vehicle VM. The depicting calculation portion 21 causes the display unit 31 to display the trajectories each of which includes the trajectory L2 that is the curved portion, and the trajectory L3 that is the straight line portion, in a manner such that the length of each trajectory L2, which is the curved portion, is changed in accordance with the angle formed by the longitudinal direction of the parking frame P in which the host vehicle VM is to be parked and the longitudinal direction of the host vehicle VM. Therefore, the driver is able to easily and intuitively recognize a guide for performing operations to back up the host vehicle VM from the point at which the host vehicle VM is currently positioned, while turning the host vehicle VM, and to back up the host vehicle VM at the steering angle of 0° at the position at which the host vehicle VM becomes parallel to the longitudinal direction of the parking frame P.

In the embodiment, when the host vehicle VM moves forward, the depicting calculation portion 21 causes the display unit 31 to display the trajectories L2 and L3 along which the host vehicle VM is to back up from the point at which the host vehicle VM is currently positioned, in a manner such that the trajectories L2 and L3 are superimposed on the image of the scene behind the host vehicle VM. The depicting calculation portion 21 causes the display unit 31 to display the trajectories each of which includes the trajectory L2 that is the curved portion, and the trajectory L3 that is the straight line portion, in a manner such that the length of each trajectory L2, which is the curved portion, is increased with increase in the angle formed by the longitudinal direction of the parking frame P in which the host vehicle VM is to be parked and the longitudinal direction of the host vehicle VM. Therefore, the driver is able to easily and intuitively recognize a guide for performing the operations to back up the host vehicle VM from the point at which the host vehicle VM is currently positioned, while turning the host vehicle VM, and to back up the host vehicle VM at the steering angle of 0° at the position at which the host vehicle VM becomes parallel to the longitudinal direction of the parking frame P.

In the embodiment, when the host vehicle VM moves forward, the trajectories L2 and L3, which do not correspond to the actual steering angle of the host vehicle VM, are displayed. Therefore, the depicting calculation portion 21 does not necessarily need to recognize the position of the parking frame P and the like. The depicting calculation portion 21 can cause the display unit 31 to display the trajectories L2 and L3, as long as the longitudinal direction of the parking frame P and the forward movement angle θ are determined. Accordingly, for example, an ECU for recognizing the parking frame P is not necessary. Thus, it is possible to configure the parking assistance apparatus at low cost.

In the embodiment, the depicting calculation portion 21 causes the display unit 31 to display the trajectories each of which includes the trajectory L2 that is the curved portion, and the trajectory L3 that is the straight line portion. The trajectory L2, which is the curved portion, extends rearward from the point at which the host vehicle VM is currently positioned. The trajectory L3, which is the straight line portion, extends from the rear end portion of the trajectory L2 that is the curved portion. Therefore, the driver is able to park the host vehicle VM in the parking frame P by performing the operation to back up the host vehicle VM while turning the host vehicle VM, and then, performing the operation to back up the host vehicle VM at the steering angle of 0°. This makes it further easier to park the host vehicle VM in the parking frame P.

In the embodiment, the depicting calculation portion 21 causes the display unit 31 to display the trajectories each of which includes the trajectory L2 and the trajectory L3. The trajectory L2, which is the curved portion, extends from the point at which the host vehicle VM is currently positioned, to the point at which the trajectory L2 is parallel to the longitudinal direction of the parking frame P in which the host vehicle VM is to be parked. The trajectory L3, which is the straight line portion, is parallel to the longitudinal direction of the parking frame P in which the host vehicle VM is to be parked. Therefore, the driver is able to make the host vehicle VM parallel to the parking frame P by backing up the host vehicle VM and making the steering angle θ° at the steering-angle turning back points TP2 at which the trajectories L2, which are the curved portions of the displayed trajectories, are connected to the trajectories L3 that are the straight line portions. This makes it further easier to park the host vehicle VM in the parking frame P.

In the embodiment, when the host vehicle VM backs up, the depicting calculation portion 21 causes the display unit 31 to display one kind of trajectories along which the host vehicle VM is to back up, in accordance with the actual steering angle of the host vehicle VM. Therefore, when the host vehicle VM backs up, the driver is able to easily and intuitively recognize the trajectories for the host vehicle VM, which are changed in accordance with the actual steering angle of the host vehicle VM. Particularly, in the case where when the host vehicle VM moves forward or when the host vehicle VM is stopped, the depicting calculation portion 21 causes the display unit 31 to display the indication including the plurality of kinds of trajectories along which the host vehicle VM is able to back up from the point at which the host vehicle VM is currently positioned, play caused by the plurality of kinds of trajectories can be reduced by displaying one kind of trajectories when the host vehicle backs up. This makes it easy to accurately park the host vehicle VM in the parking frame P.

In the embodiment, the depicting calculation portion 21 causes, the display unit 31 to display the trajectories L2 and L3 along which the host vehicle VM is to move if the host vehicle VM backs up while being steered toward a side opposite to a side toward which the host vehicle VM is steered when the host vehicle moves forward. Thus, in the parking method that is most commonly used, it is not necessary for the driver to select which of the trajectory toward the right side and the trajectory toward the left side should be displayed. This makes it further easier to perform the operation to park the host vehicle VM. In the embodiment, the depicting calculation portion 21 does not necessarily need to recognize the position of the parking frame P and the like. The depicting calculation portion 21 can cause the display unit 31 to display the trajectories L2 and L3 without the need for the driver to specify in which of the parking frame P on the right side and the parking frame P on the left side the host vehicle VM is to be parked, as long as the longitudinal direction of the parking frame P and the forward movement angle θ of the host vehicle VM are determined. Therefore, for example, an ECU for recognizing the parking frame P is not necessary. Thus, it is possible to configure the parking assistance apparatus at low cost.

In the embodiment, the depicting calculation portion 21 causes the display unit 31 to display the image of the scene behind the host vehicle VM. When the host vehicle VM moves forward, the depicting calculation portion 2L may cause the display unit 31 to display the trajectories that include one kind of trajectories L2 and one kind of trajectories L3 along which the host vehicle VM is to back up from the point at which the host vehicle VM is currently positioned. The trajectory L2 is the curved portion that extends rearward from the point at which the host vehicle VM is currently positioned. The trajectory. L3 is the straight line portion that extends from the rear end portion of the trajectory L2 that is the curved portion. The trajectory L2, which is the curved portion, extends from the point at which the host vehicle VM is currently positioned to the point at which the curved trajectory L2 is parallel to the longitudinal direction of the parking frame P in which the host vehicle VM is to be parked. The longitudinal direction of the parking frame P in which the host vehicle VM is to be parked is parallel to the trajectory L3 that is the straight line portion. Thus, the driver is able to easily and intuitively recognize the trajectories for parking the host vehicle VM. Also, the driver is able to park the host vehicle VM in the parking frame P by performing the operation to back up the host vehicle VM while turning the host vehicle VM, and then, performing the operation to make the

The invention claimed is:

1. A parking assistance apparatus comprising:
a display that displays an image of a scene behind a host vehicle; and
an electronic control unit that performs calculation to depict at least one kind of trajectory,
wherein at least when the host vehicle moves forward or when the host vehicle is stopped, the electronic control unit performs the calculation to depict a plurality of kinds of trajectories along which the host vehicle is able to back up from a point at which the host vehicle is currently positioned, and the display displays an indication including the plurality of kinds of trajectories depicted through the calculation performed by the electronic control unit, in a manner such that the indication is superimposed on the image of the scene behind the host vehicle,
wherein the display displays the depicted trajectories each of which includes a curved portion and a straight line portion, the curved portion extends rearward from the point at which the host vehicle is currently positioned, and the straight line portion extends from a rear end portion of the curved portion, and
wherein the display displays the depicted trajectories in a manner such that a length of the curved portion of each of the trajectories is changed in accordance with an angle formed by a longitudinal direction of a parking frame in which the host vehicle is to be parked and a longitudinal direction of the host vehicle.

2. The parking assistance apparatus according to claim 1, wherein
when the host vehicle backs up, the electronic control unit performs the calculation to depict one kind of trajectory along which the host vehicle is to back up, in accordance with an actual steering angle of the host vehicle, and the display displays the depicted one kind of trajectory.

3. The parking assistance apparatus according to claim 1, wherein
the electronic control unit performs the calculation to depict the plurality of kinds of trajectories along which the host vehicle is to back up while being steered toward a side opposite to a side toward which the host vehicle is steered when the host vehicle moves forward, and the display displays the depicted plurality of kinds of trajectories.

4. The parking assistance apparatus according to claim 1, wherein
each kind of trajectory is composed of trajectories for paired rear wheels of the host vehicle.

5. The parking assistance apparatus according to claim 4, wherein
at least when the host vehicle moves forward or when the host vehicle is stopped, the electronic control unit performs the calculation to depict trajectory ranges for the respective rear wheels, the display displays the depicted trajectory ranges for the respective rear wheels, and each of the depicted trajectory ranges is defined by the trajectories for one of the rear wheels, the trajectories corresponding to different steering angles.

6. The parking assistance apparatus according to claim 4, wherein
at least when the host vehicle moves forward or when the host vehicle is stopped, the electronic control unit performs the calculation to depict trajectory ranges for the paired rear wheels, the display displays the depicted trajectory ranges for the paired rear wheels, and each of the depicted trajectory ranges is defined by the trajectories for the paired rear wheels, the trajectories corresponding to one steering angle.

7. A parking assistance apparatus comprising:
a display that displays an image of a scene behind a host vehicle; and
an electronic control unit that performs calculation to depict at least one kind of trajectory,
wherein at least when the host vehicle moves forward or when the host vehicle is stopped, the electronic control unit performs the calculation to depict a plurality of kinds of trajectories along which the host vehicle is able to back up from a point at which the host vehicle is currently positioned, and the display displays an indication including the plurality of kinds of trajectories depicted through the calculation performed by the electronic control unit, in a manner such that the indication is superimposed on the image of the scene behind the host vehicle, and
wherein the display displays the depicted trajectories each of which includes a curved portion and a straight line portion, the curved portion extends from the point at which the host vehicle is currently positioned, to a point at which the curved portion is parallel to a longitudinal direction of a parking frame in which the host vehicle is to be parked, and the longitudinal direction of the parking frame, in which the host vehicle is to be parked, is parallel to the straight line portion.

8. The parking assistance apparatus according to claim 7, wherein
when the host vehicle backs up, the electronic control unit performs the calculation to depict one kind of trajectory along which the host vehicle is to back up, in accordance with an actual steering angle of the host vehicle, and the display displays the depicted one kind of trajectory.

9. The parking assistance apparatus according to claim 7, wherein
the electronic control unit performs the calculation to depict the plurality of kinds of trajectories along which the host vehicle is to back up while being steered toward a side opposite to a side toward which the host vehicle is steered when the host vehicle moves forward, and the display displays the depicted plurality of kinds of trajectories.

10. The parking assistance apparatus according to claim 7, wherein
each kind of trajectory is composed of trajectories for paired rear wheels of the host vehicle.

11. The parking assistance apparatus according to claim 10, wherein
at least when the host vehicle moves forward or when the host vehicle is stopped, the electronic control unit performs the calculation to depict trajectory ranges for the respective rear wheels, the display displays the depicted trajectory ranges for the respective rear wheels, and each of the trajectory ranges is defined by the trajectories for one of the rear wheels, the trajectories corresponding to different steering angles.

12. The parking assistance apparatus according to claim 10, wherein
at least when the host vehicle moves forward or when the host vehicle is stopped, the electronic control unit performs the calculation to depict trajectory ranges for the paired rear wheels, the display displays the depicted trajectory ranges for the paired rear wheels, and each of the depicted trajectory ranges is defined by the trajectories for the paired rear wheels, the trajectories corresponding to one steering angle.

13. A parking assistance apparatus comprising:
a display that displays an image of a scene behind a host vehicle, and
an electronic control unit that performs calculation to depict at least one kind of trajectory,
wherein at least when the host vehicle moves forward or when the host vehicle is stopped, the electronic control unit performs the calculation to depict a plurality of kinds of trajectories along which the host vehicle is able to back up from a point at which the host vehicle is currently positioned, and the display displays an indication including the plurality of kinds of trajectories depicted through the calculation performed by the electronic control unit, in a manner such that the indication is superimposed on the image of the scene behind the host vehicle, and
wherein the electronic control unit performs the calculation to depict the trajectories corresponding to steering angles of the host vehicle, which are changed in accordance with an angle formed by a longitudinal direction of a parking frame in which the host vehicle is to be parked and a longitudinal direction of the host vehicle, and the display displays the depicted trajectories.

14. The parking assistance apparatus according to claim 13, wherein
the electronic control unit performs the calculation to depict the trajectories corresponding to the steering angles of the host vehicle, which are increased with increase in the angle formed by the longitudinal direction of the parking frame in which the host vehicle is to be parked and the longitudinal direction of the host vehicle, and the display displays the depicted trajectories.

15. The parking assistance apparatus according to claim 13, wherein
when the host vehicle backs up, the electronic control unit performs the calculation to depict one kind of trajectory along which the host vehicle is to back up, in accordance with an actual steering angle of the host vehicle, and the display displays the depicted one kind of trajectory.

16. The parking assistance apparatus according to claim 13, wherein
the electronic control unit performs the calculation to depict the plurality of kinds of trajectories along which the host vehicle is to back up while being steered toward a side opposite to a side toward which the host vehicle is steered when the host vehicle moves forward, and the display displays the depicted plurality of kinds of trajectories.

17. The parking assistance apparatus according to claim 13, wherein
each kind of trajectory is composed of trajectories for paired rear wheels of the host vehicle.

18. The parking assistance apparatus according to claim 17, wherein
at least when the host vehicle moves forward or when the host vehicle is stopped, the electronic control unit performs the calculation to depict trajectory ranges for the respective rear wheels, the display displays the depicted trajectory ranges for the respective rear wheels, and each of the depicted trajectory ranges is defined by the trajectories for one of the rear wheels, the trajectories corresponding to different steering angles.

19. The parking assistance apparatus according to claim 17, wherein
at least when the host vehicle moves forward or when the host vehicle is stopped, the electronic control unit performs the calculation to depict trajectory ranges for the paired rear wheels, the display displays the depicted trajectory ranges for the paired rear wheels, and each of the depicted trajectory ranges is defined by the trajectories for the paired rear wheels, the trajectories corresponding to one steering angle.

20. A parking assistance apparatus comprising:
a display that displays an image of a scene behind a host vehicle; and
an electronic control unit that performs calculation to depict a trajectory,
wherein the electronic control unit performs the calculation to depict the trajectory along which the host vehicle is to back up from a point at which the host vehicle is currently positioned, and the display displays the depicted trajectory in a manner such that the depicted trajectory is superimposed on the image of the scene behind the host vehicle, in accordance with a time point at which a parking frame, in which the host vehicle is to be parked, is displayed in the image of the scene behind the host vehicle, and
wherein the electronic control unit performs the calculation to depict the trajectory along which the host vehicle is to back up from the point at which the host vehicle is currently positioned, and the display displays the depicted trajectory in the manner such that the depicted trajectory is superimposed on the image of the scene behind the host vehicle, after the time point at which the parking frame, in which the host vehicle is to be parked, is displayed in the image of the scene behind the host vehicle.

21. The parking assistance apparatus according to claim 20, wherein
when the host vehicle backs up, the electronic control unit performs the calculation to depict one kind of trajectory along which the host vehicle is to back up, in accordance with an actual steering angle of the host vehicle, and the display displays the depicted one kind of trajectory.

22. The parking assistance apparatus according to claim 20, wherein
the electronic control unit performs the calculation to depict the trajectory along which the host vehicle is to back up while being steered toward a side opposite to a side toward which the host vehicle is steered when the host vehicle moves forward, and the display displays the depicted trajectory.

23. The parking assistance apparatus according to claim 20, wherein
the trajectory is composed of trajectories for paired rear wheels of the host vehicle.

* * * * *